United States Patent [19]

Namba et al.

[11] Patent Number: 5,747,602
[45] Date of Patent: May 5, 1998

[54] PRODUCTION PROCESS FOR MAKING HIGH MOLECULAR WEIGHT POLYDIOXOLANE

[75] Inventors: Takashi Namba, Suita; Hiroya Kobayashi, Minoo; Kenji Minami, Ohtsu; Hiroshi Itoh, Kobe; Toshiaki Kuriyama; Masashi Yukitake, both of Suita, all of Japan

[73] Assignee: Nippon Shokubai., Ltd., Osaka, Japan

[21] Appl. No.: 777,064

[22] Filed: Dec. 30, 1996

Related U.S. Application Data

[63] Continuation of Ser. No. 403,774, Mar. 24, 1995, abandoned.

[30] Foreign Application Priority Data

| Jul. 29, 1993 | [JP] | Japan | 5-188039 |
| Jul. 29, 1993 | [JP] | Japan | 5-188040 |
| Mar. 24, 1994 | [JP] | Japan | 6-053612 |
| Mar. 24, 1994 | [JP] | Japan | 6-053613 |
| Jul. 15, 1994 | [JP] | Japan | 6-163907 |

[51] Int. Cl.$^6$ ............... C08G 4/00; C08G 2/06; C08G 2/12; C08L 59/04
[52] U.S. Cl. ............... 525/398; 528/410
[58] Field of Search ............... 525/398; 528/410

[56] References Cited

U.S. PATENT DOCUMENTS

| 3,297,647 | 1/1967 | Schott et al. |  |
| 3,318,848 | 5/1967 | Clarke | 525/398 |
| 3,337,507 | 8/1967 | Gutweiler et al. |  |
| 3,422,035 | 1/1969 | May et al. |  |
| 4,788,258 | 11/1988 | Collins et al. |  |
| 4,898,925 | 2/1990 | Collins | 525/398 |
| 5,097,077 | 3/1992 | Mueller et al. | 568/617 |
| 5,395,959 | 3/1995 | Weyer et al. | 560/231 |

FOREIGN PATENT DOCUMENTS

| 0126471 | 11/1984 | European Pat. Off. |
| 0308186 | 3/1989 | European Pat. Off. |
| 0325052 | 7/1989 | European Pat. Off. |
| 0421268 | 4/1991 | European Pat. Off. |
| 0503392 | 9/1992 | European Pat. Off. |
| 46-40702 | 12/1971 | Japan |
| 48-17390 | 5/1973 | Japan |
| 61-143428 | 7/1986 | Japan |
| 1131235 | 5/1989 | Japan |
| 2283709 | 11/1990 | Japan |
| 465414 | 2/1992 | Japan |
| 465412 | 3/1992 | Japan |

OTHER PUBLICATIONS

"Hawley's Condensed Chemical Dictionary", 12th ed., Van Nostrand Reinhold Co., New York (1993).

Makromol. Chem. 190, 929–938 (1989), *Heteropolyacids New Efficient Initiators of Cationic Polymerization* Melania Bednarek et al.

International Search Report of Int'l. Appln. No. PCT/JP94/01228.

*Primary Examiner*—Donald R. Wilson
*Attorney, Agent, or Firm*—Roylance,Abrams,Berdo & Goodman, L.L.P.

[57] ABSTRACT

A process for producing a high-molecular-weight polydioxolane, which includes the steps of: polymerizing 1,3-dioxolane using a polymerization catalyst comprising a heteropolyacid and a ketone; and neutralizing the resulting polymerization reaction product using an organic amine and/or ammonia. A hydrophilic film, which includes a resin including a polydioxolane and having a particular molecular weight and has a particular crystallinity and a particular spherulite's size. A film crumbly in cold water is produced by forming a film under particular forming conditions from a resin including a polydioxolane and having a particular molecular weight, or by subjecting an already formed film to particular thermal hysteresis.

31 Claims, 3 Drawing Sheets

PRODUCTION PROCESS FOR MAKING HIGH MOLECULAR WEIGHT POLYDIOXOLANE

This is a continuation of application Ser. No. 08/403,774 filed Mar. 24, 1995, now abandoned.

DESCRIPTION

1. Technical Field

The present invention relates to a high-molecular-weight polydioxolane and a production process therefor.

21. Background Art

Polydioxolane is a crystalline hydrophilic polymer that is synthesized by polycondensation between ethylene glycol and paraformaldehyde or by ring-opening polymerization of 1,3-dioxolane.

A ring-opening polymerization reaction of 1,3-dioxolane very intensively occurs. In the case where polymerization is carried out while stirring in a reaction vessel that is usually used, sudden boiling occurs, or the contents spout out of a condenser, because of rapid and intensive temperature-rising involved with deficiency of a rate of heat-removal. So the polymerization of high concentration 1,3-dioxolane is generally difficult. In addition, since the resulting polymerized product has a very high viscosity, it is difficult to take out the polymerized product from the vessel.

It is well known that apparatus, such as a KRC kneader, may be used to produce polyacetal. Such an apparatus has high self-cleaning performance and can continuously treat a high-viscosity liquid. In addition, it is also well known that a small amount of 1,3-dioxolane is added as a copolymerizable component in order to improve the stability of polyacetal. In the production of polyacetal, a polymerization catalyst is homogeneously mixed with a monomer. However, the same process for adding a polymerization catalyst is carried out for the polymerization of 1,3-dioxolane, a large amount of polymerization catalyst is needed, and the heat-removal is difficult because a polymerization reaction of the entire monomer progresses at one stroke and intensively generates heat. Accordingly, it is difficult to obtain a high-molecular-weight polydioxolane by polymerizing 1,3-dioxolane by applying the above-mentioned prior art.

Examples of known polymerization catalysts for 1,3-dioxolane are as follows: mineral adds, such as sulfuric acid, phosphoric acid and hydrochloric acid; Lewis acids, such as ferric trichloride, tin tetrachloride, aluminum trichloride and boron fluoride; complexes of these Lewis adds with ethers or the like; and organic aluminum. However, these catalysts have problems that the resulting polydioxolane has a low molecular weight, or that the polymerization time is long. In order to solve these problems, there were proposed methods wherein an organic aluminum-sulfuric acid reaction product (Japanese Official Patent Gazette No. Showa 46-40702) or a trialkyl aluminum-zinc chloride combination (Japanese Official Patent Gazette No. Showa 48-17390) is used as the catalyst. However, the reproductivity of these methods is not good. In addition, although a method using a heteropolyacid as the polymerization catalyst was proposed (Makromol. Chem. 190, 929 (1989)), in this method, the polymerization time is long, the number-average molecular weight of products reaches at most about 40,000, so a film having sufficient strength cannot be obtained. If a large amount of the above-mentioned polymerization catalyst is used, the polymerization is completed in a short time. However, since the polymerization progresses rapidly and intensively, the removal of polymerization heat is substantially impossible. As a result, the temperature in a polymerization system rapidly and intensively rises, and the molecular weight of the resulting polydioxolane is low.

In the case where, after 1,3-dioxolane is polymerized, the resulting polymer is left as it is, the polymer decomposes. Therefore, it is preferable to neutralize the polymer using alkaline substances, such as sodium methylate. However, in the case where the neutralization is carried out using common inorganic or organic bases, the molecular weight of the resulting polydioxolane is lowered.

A polydioxolane is soluble in warm water, and a high-molecular-weight polydioxolane can form a soft film. It can be considered to use this film for packing materials, fiber-treating agents, thickeners, plasticizers, and so on, by utilizing the above-mentioned characteristics of the polydioxolane.

There is polyethylene oxide as an example of water-soluble crystalline polymers having a structure similar to that of polydioxolane, and films including polyethylene oxide and production processes for polyethylene oxide are well known. Since both polyethylene oxide and polydioxolane have a similar structure, they tend to be taken to have very similar characters. However, since the crystallization temperature and the crystallization rate are very different between polyethylene oxide and polydioxolane, even if a film-forming method for polyethylene oxide is directly, or after only a few changes of conditions are made, applied to formation of a film of polydioxolane, an excellent film cannot be obtained. Accordingly, there has not yet been obtained a film that includes a resin including the polydioxolane and has excellent mechanical properties.

Polyethylene oxide and polyvinyl alcohol are examples of hydrophilic polymers. However, films having these resins have stability problems under high humidity. For instance, their mechanical properties can deteriorate due to absorption of humidity, the films curl and lose their handling property, or the tackiness develops on a surface of the films. In addition, almost all the films having the above-mentioned resins are soluble in water, so, when they come into contact with water, a portion of the film swells, or a hole opens in the film. Therefore, the management for proof of humidity and water is needed during storage and during transportation.

It is well known to use the above-mentioned films as water-soluble packing materials. However, when the films including the above-mentioned resins are placed into an aqueous medium, they dissolve, increase the viscosity, and cover their contents, whereby smooth release and dissolution of the contents is disturbed.

DISCLOSURE OF THE INVENTION

OBJECTS OF THE INVENTION

It is an object of the present invention to obtain a high-molecular-weight polydioxolane with good reproductivity by mildly polymerizing 1,3-dioxolane on an industrial scale.

It is another object of the present invention to obtain a high-molecular-weight polydioxolane with good efficiency and in high yield.

It is also another object of the present invention to obtain a hydrophilic film, which includes a resin including a polydioxolane, has excellent mechanical properties, is stable even under high humidity, and has high water-resistance.

It is also another object of the present invention to obtain a film, which includes a resin including a polydioxolane, has excellent mechanical properties, is stable even under high humidity, and has high water-resistance, and in addition, which substantially does not dissolve in cold water, but has a property whereby part of the film crumbles in cold water (crumbleability in cold water).

SUMMARY OF THE INVENTION (1) A process for producing a high-molecular-weight polydioxolane, relating to the present invention, includes the steps of:

polymerizing 1,3-dioxolane using a polymerization catalyst including a heteropolyacid; and neutralizing the resulting polymerization reaction product using an organic amine and/or ammonia.

The polymerization catalyst preferably further includes an oxygen-containing organic compound.

The oxygen-containing organic compound is preferably a carbonyl compound, and more preferably a carbonyl compound having a boiling point lower than 150° C.

The heteropolyacid preferably has a crystal water content of 1 to 15% by weight, more preferably 3 to 8% by weight.

The heteropolyacid is preferably used in a ratio of 0.001 to 2 parts by weight, more preferably 0.01 to 0.2 parts by weight, per 100 parts by weight of 1,3-dioxolane.

When the polymerization catalyst further includes the carbonyl compound, the heteropolyacid preferably has a crystal water content of 1 to 15% by weight, more preferably 3 to 8% by weight.

When the polymerization catalyst further includes the carbonyl compound, the heteropolyacid is preferably used in a ratio of 0.001 to 2 parts by weight, more preferably 0.01 to 0.2 parts by weight, per 100 parts by weight of 1,3-dioxolane.

The carbonyl compound is preferably used in a ratio of 10 to 50,000 parts by weight per 100 parts by weight of the heteropolyacid.

(2) A hydrophilic film, relating to the present invention, includes a resin including a polydioxolane and having a number-average molecular weight of 50,000 to 500,000 which is measured by size-exclusion chromatography and calculated as polystyrene. In addition, this film has a crystallinity of 25 to 75%, according to observations made by wide-angle X-ray diffraction, and has a spherulite's size of 500 μm or less measured using a polarizing microscope.

The number-average molecular weight is preferably in a range of 80,000 to 500,000, and more preferably in a range of 100,000 to 300,000.

The crystallinity is preferably in a range of 30 to 60%.

The spherulite's size is preferably 100 μm or less.

The film preferably has a thickness of 10 to 300 μm.

(3) A process for producing a hydrophilic film, relating to the present invention, includes the steps of:

forming a film by extruding a resin from a forming machine having an outlet temperature of 50° to 200° C. into a film shape, wherein the resin includes a polydioxolane and has a number-average molecular weight of 50,000 to 500,000 which is measured by size-exclusion chromatography and calculated as polystyrene; and cooling the resulting film into a temperature range of −10° to 30° C. in a cooling time of 2 seconds to 5 minutes.

The outlet temperature of the extruder is preferably in a range of 100° to 150° C.

The film obtained by this process preferably has a thickness in a range of 10 to 300 μm.

(4) A process for producing a film crumbly in cold water, relating to the present invention, includes the steps of:

forming a film by extruding a resin from a forming machine having an outlet temperature of 50° to 200° C. into a film shape, wherein the resin includes a polydioxolane and has a number-average molecular weight of 50,000 to 300,000 which is measured by size-exclusion chromatography and calculated as polystyrene;

maintaining temperature of the resulting film in a range of 18° to 30° C. over a period of 15 seconds to +1 minutes; and further cooling to 15° C. or lower the film which is cooled in the maintaining step.

The outlet temperature of the extruder is preferably in a range of 65° to 150° C.

The film obtained by this process preferably has a thickness in a range of 10 to 250 μm, more preferably 30 to 150 μm.

(5) Another process for producing a film crumbly in cold water, relating to the present invention, includes the steps of:

heating a film to a temperature of 50° to 150° C., wherein the film includes a resin including a polydioxolane and having a number-average molecular weight of 50,000 to 300,000 which is measured by size-exclusion chromatography and calculated as polystyrene;

maintaining temperature of the heated film in a range of 18° to 30° C. over a period of 15 seconds to 30 minutes; and further cooling to 15° C. or lower the film which is cooled in the maintaining step.

The film obtained by this process preferably has a thickness in a range of 10 to 250 μm, more preferably 30 to 150 μm.

(6) An apparatus for producing a hydrophilic thermoplastic resin, relating to the present invention, includes: a kneader having a kneading part and a kneaded product-discharging part; a twin-screw extruder; a monomer-supplying part; a polymerization catalyst-supplying part; and a neutralizer-supplying part. The kneading part of the kneader works for kneading a polymerization catalyst and a monomer which includes 60% by weight or more of a compound having a 1,3-dioxolane ring in its molecule. The kneaded product-discharging part of the kneader works for discharging a kneaded product which is obtained from the kneading part. The twin-screw extruder is linked with the kneaded product-discharging part and works for receiving the kneaded product from the kneader and carrying out twin-screw extrusion treatment. The monomer-supplying part is linked with the kneader and works for supplying the monomer to the kneading part. The polymerization catalyst-supplying part is linked with the kneader and works for supplying the polymerization catalyst to the kneading part. The neutralizer-supplying part is linked with the kneader and works for supplying a neutralizer to the kneaded product.

The production apparatus relating to the present invention may further include an assistant kneader which is arranged between the kneaded product-discharging part of the kneader and the twin-screw extruder.

The production apparatus relating to the present invention may further include a devolatilizing part in the twin-screw extruder.

The kneader may include: a first rotary shaft; and at least one kind of first paddle selected from the group including: a spiral paddle which is installed on a periphery of the first rotary shaft; and numbers of paddles which are arranged at intervals in a direction of a rotational axis.

The kneader may further include: a second rotary shaft which is arranged adjacent and parallel to the first rotary shaft; and at least one kind of second paddle selected from the group including: a spiral paddle which is installed on a periphery of the second rotary shaft; and numbers of paddles which are arranged at intervals in a direction of a rotational axis; wherein the second paddle is arranged at a slight distance from the first paddle.

(7) A process for producing a hydrophilic thermoplastic resin, relating to the present invention, includes using a kneader including: a first rotary shaft; and at least one kind of first paddle selected from the group including: a spiral paddle which is installed on a periphery of the first rotary shaft; and numbers of paddles which are arranged at intervals in a direction of a rotational axis; and the process includes a monomer-supplying step, a polymerization catalyst-adding step, and a neutralizer-added step. The monomer-supplying step includes supplying a monomer including 60% by weight or more of a compound having a 1,3-dioxolane ring in its molecule into the kneader. The polymerization catalyst-adding step includes intermittently adding a polymerization catalyst into the kneader in order to locally initiate polymerization of the monomer. The neutralizer-adding step includes adding a neutralizer into the kneader in order to deactivate the polymerization catalyst which is contained in a polymerized product formed in the kneader.

The kneader may further include: a second rotary shaft which is arranged adjacent and parallel to the first rotary shaft; and at least one kind of second paddle selected from the group including: a spiral paddle which is installed on a periphery of the second rotary shaft; and numbers of paddles which are arranged at intervals in a direction of a rotational axis; wherein the second paddle is arranged at a slight distance from the first paddle.

The polymerization catalyst-adding step is preferably carried out in a reaction temperature range of 0° to 70° C.

The neutralizer-adding step is preferably carried out within 1 hour after initiation of the polymerization catalyst-adding step.

These and other objects and advantage of the present invention will be more fully apparent from the following detailed description.

DETAILED DESCRIPTION OF THE INVENTION (Production process for polydioxolane)
Polymerization step:

The polymerization catalyst preferably has high activity, and its examples are as follows: heteropolyacids; boron trifluoride etherate; boron tetrafluoride oxonium compounds, such as triethyloxonium tetrafluoroborate; an aluminoxane-sulfuric acid mixture. These may be used in combinations with each other. Of them, preferred are heteropolyacids, triethyloxonium tetrafluoroborate, and the aluminoxane-sulfuric acid mixture, because these have high activity and give high-molecular-weight polymers.

The heteropolyacid used for polymerizing the monomer is preferably a polyacid having a Keggin structure in which a central atom of a framework acid is an atom selected from molybdenum, tungsten, vanadium and the like and in which a heteroatom is an atom selected from silicon, phosphorus, germanium, titanium, zirconium, boron, arsenic, cobalt and the like. Examples of such a heteropolyacid are as follows: phosphotungstic acid, silicotungstic add, phosphomolybdic acid, silicomolybdic acid, borotungstic acid, boromolybdic acid, cobaltomolybdic acid, cobaltotungstic acid, arsenotungstic acid, germanotungstic acid, phosphomolybdotungstic acid, and boromolybdotungstic acid. Of these acids, phosphotungstic acid is particularly preferable in respects of uncolored property, solubility, and polymerization-initiatability.

As to the heteropolyacid used in the present invention, there can also be used its partially neutralized salt. Examples of the partially neutralized salt are as follows: sodium salts, potassium salts, cesium salts, organic amine salts, and ammonium salts. The partially neutralized salt of the heteropolyacid may, after its preparation, be added to 1,3-dioxolane, or it may be formed by reacting a heteropolyacid and a base in 1,3-dioxolane.

The heteropolyacid used in the present invention is preferably used after its crystal water content is adjusted, preferably into a range of 1 to 15% by weight, particularly preferably into a range of 3 to 8% by weight, by drying the heteropolyacid at a high temperature and/or under a reduced pressure. In the case where the crystal water content is less than 1% by weight or more than 15% by weight, the molecular weight of the resulting polydioxolane may not be high. As used herein, the term "crystal water" refers to the water of hydration of the heteropolyacid.

Although the amount of the polymerization catalyst used in the present invention is not especially limited, it is preferably in a range of 0.001 to 2 parts by weight, particularly in a range of 0.01 to 0.2 parts by weight, per 100 parts by weight of 1,3-dioxolane. In the case where the amount is smaller than 0.001 parts by weight, the polymerization may not be initiated; and in the case where the amount is larger than 2 parts by weight, the polymerization may be too intensive to control, or the molecular weight of the resulting polydioxolane may be low.

In addition, when continuous polymerization is carried out, the amount of the polymerization catalyst is preferably in a range of 0.0001 to 0.1 mmol per 1 mol of monomer. In the case where the amount of the catalyst is smaller than 0.0001 mmol, the polymerization rate is very slow, so the productivity is poor, and besides, since the polymerization is easily influenced by water content or active hydrogen in a monomer or a solvent, the polymerization may not occur at all, or the polymerization may cease on the way. On the other hand, in the case where the amount of the polymerization catalyst is larger than 0.1 mmol, the polymerization is so intensive that the removal of heat is difficult, or the molecular weight of the resulting polymer is low.

The polymerization catalyst can be used as it is. However, in the case where the heteropolyacid is added in powdered condition, it may be like fish eye and the polymerization of 1,3-dioxolane may not homogeneously occur, or the polymerization may occur too intensively to control.

In addition, when the heteropolyacid is used as the polymerization catalyst, the heteropolyacid is preferably combined with an oxygen-containing compound to form a combined catalyst and then be added to 1,3-dioxolane.

Examples of the oxygen-containing compound to form a combined catalyst with the heteropolyacid in the present invention are ethers and carbonyl compounds. Of the oxygen-containing compounds, ethers and cyclic ethers are preferable, because combined catalysts obtained from them have high activity, and in addition, the carbonyl compounds are preferable, because they make a reaction mild. Of the oxygen-containing compounds, substances having active hydrogen in their molecules, such as alcohols, may decrease the molecular weight of the resulting polymer.

Examples of the above-mentioned ethers are diethyl ether, ethylene glycol dimethyl ether, diethylene glycol dimethyl ether, 1,4-dioxane, and the like. These may be used in combinations with each other.

Although the above-mentioned carbonyl compounds are not especially limited, their examples are as follows: acetone, methyl ethyl ketone, methyl isobutyl ketone, diacetone alcohol, acetyl acetone, ethyl acetate, butyl acetate, methyl propionate, cyclohexanone, and the like. These may be used in combinations with each other. Of them, carbonyl compounds having a boiling point lower than 150° C. are preferable if it is considered that they need to be removed after polymerization. Particularly, acetone and methyl ethyl ketone are preferable, because they have a great effect by which the polymerization mildly occurs.

Although the amount of the oxygen-containing compound used in the present invention is not especially limited, it is preferably in a range of 10 to 50,000 parts by weight, particularly preferably in a range of 50 to 5,000 parts by weight, per 100 parts by weight of heteropolyacid. The heteropolyacid and the oxygen-containing compound may be mixed and then the resulting combined catalyst may be added to 1,3-dioxolane; or the oxygen-containing compound may be mixed with 1,3-dioxolane and then the heteropolyacid may be added to the resulting mixture, whereby a combined polymerization catalyst is formed from the oxygen-containing compound and the heteropolyacid in a polymerization system. However, it is preferable to use a mixture of the heteropolyacid and the oxygen-containing compound, because even a small amount of the oxygen-containing compound is effective.

In addition, the polymerization catalyst in the present invention may be used in condition of a polymerization catalyst solution in which the polymerization catalyst is dissolved in a concentration of 0.1% by weight or more in a solvent that does not deactivate the polymerization catalyst.

The concentration of the polymerization catalyst solution is preferably in a range of 0.1 to 30% by weight, particularly 1 to 10% by weight. In the case where the concentration is less than 0.1% by weight, since the concentration of 1,3-dioxolane is low, the molecular weight of the resulting polydioxolane is low. In the case where the concentration is more than 30% by weight, the polymerization may occur too intensively to control.

The solvent used for dissolving and diluting the polymerization catalyst is not especially limited as long as it does not deactivate the polymerization catalyst. Examples of the solvent are as follows: oxygen-containing organic solvents, such as acetone, methyl ethyl ketone, methyl isobutyl ketone, diethyl ether, ethylene glycol dimethyl ether, dioxane, tetrahydrofuran, ethyl acetate, and butyl acetate; chloroform; dichloromethane; hexane; cyclohexane; toluene; and xylene. Particularly, carbonyl compounds, such as acetone, methyl ethyl ketone and ethyl acetate, are preferable, because they are excellent in respects of dissolubility and polymerization properties. Any mixture of the above-mentioned solvents may be used. Although the above-mentioned solvents are usually used as they are, in order to obtain a polymer having a very high molecular weight, the solvents are desired to be used after they have been distilled or after water content, impurities and so on are removed from them using adsorbents, such as molecular sieves, or using driers, such as calcium hydride.

Methods for adding the polymerization catalyst (or the polymerization catalyst solution) are not especially limited, and the entire amount of the catalyst may be added at once, or the catalyst may intermittently be added. However, the intermittent addition is preferable. Examples of the method for intermittently adding the polymerization catalyst (or the polymerization catalyst solution) are as follows: a method wherein the catalyst is dropwise added from a supplying nozzle that is placed at a distance from a surface of a monomer, using a pump for feeding a constant amount of liquid; and a method wherein the catalyst is added intermittently at a constant interval of time from a supplying nozzle that is immersed into a monomer.

Particularly, in the case where the polymerization catalyst solution is intermittently added, its concentration is preferably 1% by weight or more. In the case where the concentration is less than 1% by weight, since the concentration is too low to immediately initiate a reaction, the polymerization catalyst diffuses into the entire monomer before a reaction initiates, and a polymerization reaction progresses at one stroke, and in addition, a large amount of the polymerization catalyst is needed for initiating the polymerization reaction, and once the reaction initiates, the heat is intensively generated, so the removal of heat becomes very difficult.

The timing and the number of times for adding the polymerization catalyst are not especially limited. However, the catalyst is usually added from the same supplying inlet as for the monomer, or from another supplying inlet that is situated just behind the supplying inlet for the monomer. In addition, in the case where a combined catalyst, such as an aluminoxane-sulfuric acid mixture catalyst, is used or where two or more kinds of polymerization catalysts are used, inlets for supplying respective catalysts may be either identical or different.

An example of the monomer including a compound having a 1,3-dioxolane ring in its molecule is a mixture of this compound with a monomer that is copolymerizable with the compound having a 1,3-dioxolane ring in its molecule.

Examples of the compound having a 1,3-dioxolane ring in its molecule are 1,3-dioxolane, 2-methyl-1,3-dioxolane, 4-methyl-1,3-dioxolane, 4-ethyl-1,3-dioxolane, and 2-phenyl-1,3-dioxolane.

Examples of monomers copolymerizable with 1,3-dioxolane are: unsaturated hydrocarbons, such as styrene, (meth)acrylic acid, (meth) acrylic acid esters, ethylene, and propylene; cyclic ethers, such as trioxane, ethylene oxide, propylene oxide, tetrahydrofuran, 1,3,6-trioxocane, and 1,3-dioxepane; lactones or lactams, such as γ-butyrolactone, glycolide, lactide, ε-caprolactone, and ε-caprolactam. These may be used in combinations with each other.

The weight ratio of these copolymerizable monomers to a total of all monomers that are used is smaller than 40%, and preferably not larger than 10%. In the case where the weight ratio of the copolymerizable monomers is not smaller than 40%, since the polymerizability of the monomers may be decreased, the resulting polymer may have a very low molecular weight, or the polymerization conversion may be very low. In addition, in the case where it is intended to obtain a polymer having a very high molecular weight, it is desirable that the weight ratio of the copolymerizable components is not larger than 10%.

In the present invention, the polymerization reaction is usually carried out in the absence of a solvent. Especially, although the solvent is used only in the case where the use of a solvent is unavoidable due to a problem of the heat-removal and a problem of the compatibility of monomers with each other, the amount of the solvent used on this occasion is not larger than is necessary. For example, the amount of the solvent is preferably smaller than 5 parts by weight per 100 parts by weight of 1,3-dioxolane. In the case where the solvent is used in an amount larger than 5 parts by weight, the resulting polydioxolane may have a low molecular weight. Examples of solvents as preferably used are:

ketones, such as methyl ethyl ketone, acetone, and methyl isobutyl ketone; cyclic ethers, such as dioxane; halogen-containing hydrocarbons, such as chloroform, dichloromethane, and trichlorotrifluoroethane; aromatic hydrocarbons, such as toluene and xylene; and alcohols, such as methanol, ethanol, and 2-propanol. A mixture of two or more kinds of these compounds may also be used. In addition, it is desired to select a solvent having no active hydrogen from the above-mentioned solvents, if possible, and to dehydrate it before use. For example, the contents of active hydrogen and water in the solvent is desired to be 1 mol % or lower, and more desired 0.1 mol % or lower, to the monomers.

In the present invention, although the temperature where 1,3-dioxolane is polymerized is not especially limited, it is preferably in a range of −10° to 100° C. Especially, in order to obtain a high-molecular-weight polydioxolane, it is more preferable to adjust the polymerization-initiation temperature into a range of 0° to 30° C. and to adjust the highest temperature during polymerization into a range of 30° to 80° C., by heating or cooling. In the case where the polymerization temperature is lower than −10° C., handling may be difficult, because the polymerization rate is slow, or because the resulting polydioxolane has a low molecular weight or is solidified or highly viscous. In the case where the polymerization temperature is higher than 100° C., the resulting polydioxolane may have a low molecular weight.

When the continuous polymerization of 1,3-dioxolane is carried out in the present invention, there may be added various additives (such as fillers, dyes, pigments, stabilizers, lubricants, and nucleating reagents that do not impede the polymerization of the monomer.

Neutralization step:

In the case where a hydrophilic thermoplastic resin obtained by the polymerization process of the present invention is left in condition where the polymerization catalyst retains its activity, since the decomposition of the resulting polymer may occur, it is preferable to deactivate the polymerization catalyst that remains in the polymer. Examples of deactivators for the polymerization catalyst are basic compounds, such as ammonia, organic amines, and sodium methylate. These may be used in combinations with each other. Of the above-mentioned deactivators, amines are particularly favorably used, because they have good diffusibility in the polymer and can rapidly deactivate the polymerization catalyst.

Although the organic amines used in the present invention are not especially limited, their examples are trimethyl amine, triethyl amine, triisopropyl amine, diethyl amine, dimethyl amine, ethyl amine, methyl amine, isopropyl amine, n-butyl amine, ethylene diamine, diethylene triamine, aniline, pyridine, piperidine, piperadine. These may be used in combinations with each other. The organic amine and/ or ammonia may be mixed in liquid or gaseous condition with a polymerization reaction product. The organic amine and/or ammonia is preferably used in an amount of 1 to 30 times the acid equivalent of the heteropolyacid. In the case where the amount of the organic amine and/ or ammonia is smaller than 1 time the acid equivalent, the heteropolyacid is not entirely neutralized, so the molecular weight of the resulting polydioxolane may be lowered. Even if the organic amine and/or ammonia is used in an amount larger than 30 time the acid equivalent, effects corresponding with the increase of the amount are often not obtained. In the case where the amount of the organic amine and/or ammonia is smaller than of 1,3-dioxolane, it is preferable to dilute the organic amine and/or ammonia with an organic solvent and then mix them with the polymerization reaction product. Although the organic solvent used for diluting the organic amine and/ or ammonia is not especially limited so long as it can dissolve the organic amine and/or ammonia, organic solvents having a boiling point of 120° C. or lower are favorable, because, since they are easily removed, the resulting high-molecular-weight polydioxolane is easily purified. It is particularly preferable to use 1,3-dioxolane as a solvent, because it can be recovered and used again together with unreacted 1,3-dioxolane. In the case where inorganic bases, such as sodium hydroxide, potassium hydroxide, and sodium methoxide, are used for neutralizing the polymerization reaction product, the molecular weight of the resulting polydioxolane is not high. In the case where the polymerization reaction product is taken out without neutralization, a polydioxolane having a low molecular weight is only obtained, and its molecular weight greatly decreases with time.

There is no especial limitation in a polymerization time of 1,3-dioxolane, that is, a time from addition of the polymerization catalyst to 1,3-dioxolane till addition of the organic amine and/or ammonia. Although an optimal value of the polymerization time depends upon polymerization temperature, in the case where the polymerization temperature is in a range of −10° to 100° C., the polymerization time is preferably in a range of 2 to 300 minutes, particularly in a range of 5 to 100 minutes. In the case where the polymerization time is shorter than 2 minutes, the molecular weight of the resulting polydioxolane or the polymerization conversion may be low. In the case where the polymerization time is longer than 300 minutes, the molecular weight of the resulting polydioxolane may be low.

In addition, in the case where continuous polymerization is carried out, the deactivation of the polymerization catalyst (the addition of the organic amine and/or ammonia) is preferably carried out within 1 hour, more preferably within 30 minutes, after adding the polymerization catalyst. In the case where the time from addition till deactivation of the polymerization catalyst is longer than 1 hour, the decomposition of the resulting polymer occurs, so the high-molecular-weight polymer may not be obtained.

There is no especial limitation in a method for deactivating the polymerization catalyst, and this method can be carried out using a batch type or continuous type apparatus that can knead a high-viscosity polymer and a deactivator. In addition, in the case where the deactivation of the polymerization catalyst is continuously carried out, there is employed a method wherein a polymer discharged from a polymerization reactor is kneaded using the same continuous type kneader as the reactor used for the polymerization reaction; or a method wherein a deactivator-adding inlet is arranged just before a discharging outlet of a polymerization reactor and wherein the polymerization and the deactivation of the polymerization catalyst are carried out in an identical reactor.

(Apparatus for producing polydioxolane)

In the present invention, an apparatus for polymerizing 1,3-dioxolane is not especially limited, for example, there can be used a vessel type reactor, a twin-shaft mixing stirrer, a static mixer, and so on.

A kneader used for the production apparatus of the present invention has a single rotary shaft or two or more rotary shafts parallel to each other. Each rotary shaft has at least one kind of paddle selected from the group including: a spiral paddle which is installed on a periphery of the rotary shaft; and numbers of paddles which are arranged at intervals in a direction of a rotational axis. These paddles are arranged at a slight distance from an internal wall of a reactor body, and, in the case where the kneader has two or more rotary shafts, the paddles are arranged at a slight distance from paddles installed on adjacent rotary shafts.

Although the shape of the stirring paddle installed on a periphery of the rotary shaft in the kneader of the present invention is not especially limited, examples of the shape are a spiral shape, a hollow disk wing shape, a three-paddle wing shape, a spectacles wing shape, a lattice wing shape, a shape having convex lens type cross section vertical to a rotational-axis direction, an oval shape, a shape of a circle having a deviated center, a quasipolygon, such as Japanese food "Omusubi" having a shape of a pseudo-triangle, and so on.

The kneader as above-mentioned is generally a continuous type reactor or extruder having high self-cleaning performance, which is called a continuous type kneader or a single- or twin-screw extruder. Its Examples are a KRC kneader (made by Kurimoto, Ltd.), an SCR kneader (made by Mitsubishi Heavy Industries, Ltd.), Bivolak (made by Sumitomo Heavy Industries, Ltd.), TEX-K (made by The Japan Steel Works, Ltd.), a single- or twin-screw extruder as is widely used for extrusion forming or devolatilization of plastics, and so on.

An example of the production apparatus of the present invention is shown in FIG. 1. This example includes: a kneader 1 having a kneading part 11 and a kneaded product-discharging part 6; and a twin-screw extruder 2 having a devolatilizing part 8. Between the kneader 1 and the twin-screw extruder 2, there is further arranged an assistant kneader 7. With the kneading part 11, there are linked the following two component parts: a monomer-supplying part 3 for supplying the kneading part 11 with a constant amount of monomer including 60% by weight or more of a compound having a 1,3-dioxolane ring in its molecule; and a polymerization catalyst-supplying part 4 for supplying the kneading part 11 with a constant amount of polymerization catalyst. In addition, with the kneaded product-discharging part 6, there is linked a neutralizer-supplying part 5.

As shown in FIG. 2, the kneading part 11 of the kneader 1 is linked with a driving part 9 including a motor and a decelerator. As shown in FIG. 3, the kneading part 11 has a two-separable trough 10 and a pair of rotary shafts 12, 14 which are supported by the trough 10 so as to freely rotate and are driven by the driving part 9. Numbers of first paddles 13, 15, having in profile a convex lens shape, are arranged and fixed on each the rotary shafts 12, 14 in their axial direction. Each of the paddles 13, 15 is arranged so that their rotational phases are shifted by the number of the paddles. Consequently, even if two kinds of raw materials supplied into the kneading part 11 have a high viscosity, they are kneaded and transported with good efficiency in a short period of time.

(Film including polydioxolane)
Material:

In the present invention, although the resin including a polydioxolane used for producing a hydrophilic film may be synthesized by any synthesis process, there is preferably used a resin having a number-average molecular weight in a range of 50,000 to 500,000, more preferably 80,000 to 500,000, still more preferably 100,000 to 300,000, which is measured by size-exclusion chromatography and calculated as polystyrene. In the case where the molecular weight of the resin is lower than the range, the resulting film is brittle after cooling. And, in the case where the molecular weight of the resin is higher than the range, the melt viscosity of the resin is very high, so, when the resin is formed into a film, the fluidity and workability of the resin are very poor. In the case where the compatibility of high mechanical strength with excellent workability is demanded to a film, a polydioxolane having a number-average molecular weight in a range of 100,000 to 300,000 is preferably used.

In the present invention, examples of the resin including a polydioxolane used for producing a hydrophilic film are as follows: homopolymers of polydioxolanes; block copolymers and random copolymers, which are made by copolymerizing 1,3-dioxolane with monomers copolymerizable with 1,3-dioxolane within a range where crystalline property of the polydioxolane is not spoiled; resin compositions prepared by mixing homopolymers and/or copolymers of dioxolanes with other polymers within a range where crystalline property of the polydioxolane is not spoiled; and so on.

The resin, that is preferably used in the present invention and includes a polydioxolane, is synthesized by cationic homopolymerization of 1,3-dioxolane or by cationic copolymerization of a mixture of 1,3-dioxolane with a monomer copolymerizable with 1,3-dioxolane. On this occasion, it is preferable to use the following catalysts: heteropolyacids, such as phosphotungstic acid, silicotungstic acid, and phosphomolybdic acid; boron trifluoride; complexes of boron fluoride-with organic substances, such as boron trifluoride etherates and triethyloxonium tetrafluoroborate; organometallic compounds, such as triethylaluminum, aluminum isopropoxide, and titanium isopropoxide; because, if these catalysts are used, polydioxolanes having a desired molecular weight can easily be synthesized.

Examples of the polymers, which are mixed with homopolymers and copolymers of dioxolanes, are as follows: poly(meth)acrylic acids, poly(meth)acrylic acid esters, polyvinyl alcohols, polyethylenes, polypropylenes, polystyrenes, polyethylene glycols, polypropylene glycols, polyacetals, polytetramethylene oxides, polyethylene terephthalates, polylactic acids, polyglycolic acids, poly(3-hydroxybutyrate), poly(3-hydroxybutyrate-3-hydroxyvalerate), poly($\epsilon$-caprolactone), poly(ethylene succinate), poly(tetramethylene succinate), starch, chitin, chitosan, cellulose, carboxymethyl cellulose, acetic acid cellulose, and so on.

Production process:

The film including a resin including a polydioxolane, relating to the present invention, is produced by a process including a film-forming step of making a film by extruding the resin from a forming machine having an outlet temperature of 50° to 200° C., preferably 100° to 150° C., into a film shape. In the case where the outlet temperature of the forming machine is higher than the above-mentioned range, the melt viscosity of the resin is very low, or, when the forming by inflation is carried out, since the resin cannot support its weight, it is difficult to continuously pull out the resulting film. In addition, when the forming is carried out using a T-die, the width of a melted film is narrow due to its surface tension after extrusion, or there occur problems that holes are opened in the film, and that the film is broken. Furthermore, it is not favorable to maintain the resin including a polydioxolane at a temperature higher than 200° C. for a long period of time, because the resin may be deteriorated and it may be difficult to keep the quality uniformity of the resulting film. On the other hand, in the case where the outlet temperature of the forming machine is lower than the above-mentioned range, since the melted condition of the resin is not uniform, it is difficult to obtain a homogeneous film, and in addition, since the melt viscosity of the resin is too high, the productivity of the film may be very poor.

The film, melted and extruded under the above-mentioned conditions, is made into a film by cooling the melted film into a temperature range of −10° to 30° C., preferably 0° to 25° C., in a cooling time of 2 seconds to 5 minutes, preferably 5 seconds to 3 minutes. In the case where the melted and extruded film is cooled to a temperature of −10° C. or lower within 2 seconds, since the crystallization of the resulting film is incomplete, the crystallization further progresses in a step of reverting the film temperature to room temperature, so the quality of the film changes with time, and in addition, since the film slowly crystallizes at room temperature, the spherulite's size of the film becomes very large, so the extension of the film may be low. On the other hand, in the case where the melted and extruded film is not cooled to a temperature of 30° C. or lower within 5 minutes, the productivity of the film very poor, and, since the spherulite's size of the film is large, the extension of the film is low.

In addition, if the resin is extruded into a film shape in a forming machine outlet temperature range of 100° to 150° C. and if the resulting film is cooled into a temperature range of 0° to 15° C. in a cooling time of 5 seconds to 3 minutes, a hydrophilic film having excellent performance, with regard to surface smoothness, transparency, uniformity, and mechanical properties, can be produced with high forming efficiency.

The process for forming a film including a polydioxolane, relating to the present invention, is not especially limited, and any conventional process may be employed so long as it satisfies conditions for forming a film of the present invention. Examples of the film-forming process are inflation processes, T-die processes, calender processes, and so on. If a film is formed by these forming processes under non-drawing conditions, a film having a crystallinity of 25 to 45% can be obtained. In addition, if the resulting film is hot-drawn or cold-drawn in directions of one axis or two axes in the same way as films including other resins, the crystallinity can be enhanced up to a range of 30 to 75%. Although the rolling of the film decreases the extension of the film, it greatly increases the strength of the film. In addition, the film may be applied on other base materials to form a multi-layered structure.

Film:

The film including a resin having a polydioxolane, relating to the present invention, has a crystallinity of 25 to 75%, preferably 30 to 60%, measured by wide-angle X-ray diffraction, and has a spherulite's size of 500 µm or less, preferably 100 µm or less, measured using a polarizing microscope. In the case where the crystallinity is less than 25%, although a film having a very large extension is obtained, its strength is very low. Or otherwise in the case where the crystallinity is more than 75%, although a film having high strength is obtained, its extension is very small. In addition, even if the crystallinity of the film is in the above-mentioned range, in the case where the spherulite's size measured using a polarizing microscope is larger than 500 µm, there is only obtained a film having low surface smoothness and very small extension. On the other hand, if the spherulite's size is small, there can be obtained a film having high strength and large extension, and its transparency and surface smoothness are improved. Therefore, the spherulite's size of the film of the present invention does not especially have a lower limit, and the smaller it is, the better it is, so there can also favorably be used a film of which the spherulite's size is so small that it cannot be observed using a polarizing microscope. In addition, in the case where it is intended to obtain a film having high transparency, the spherulite's size is preferably 400 nm or less.

Although the thickness of the film of the present invention is not especially limited, in order to obtain a film having softness and toughness, its thickness is preferably in a range of 10 to 300 µm. However, in the case where a multi-layered structure is formed and the needed strength can be obtained by selecting a base material to be laminated, even if the thickness of the film is less than 10 µm, there is no problem.

(Film crumbly in cold water)

Materials:

In the present invention, although the resin, which includes a polydioxolane and is used for producing a film crumbly in cold water, may be synthesized by any conventional synthesis process, the resin preferably has a number-average molecular weight in a range of 50,000 to 300,000, more preferably 70,000 to 250,000, which is measured by size-exclusion chromatography and calculated as polystyrene. In the case where the molecular weight is lower than this range, the resulting film becomes brittle after cooling. In addition, a polydioxolane having a number-average molecular weight higher than the above-mentioned range crumbles in cold water very slowly. In the case where the high mechanical strength is demanded to the film together with the appropriate crumbleability in cold water and the excellent film-formability, a polydioxolane having a number-average molecular weight of 70,000 to 250,000 is favorably used.

Production process:

The film crumbly in cold water, relating to the present invention, is produced by a process including the steps of: extruding a resin from a forming machine having an outlet temperature of 50° to 200° C., preferably 65° to 150° C., into a film shape; maintaining temperature of the resulting melted film in a range of 18° to 30° C. over a period of 15 seconds to 30 minutes; and cooling the film to 15° C. or lower; or produced by a process including the steps of: heating the once formed film to a temperature of 50° to 150° C.; maintaining temperature of the heated film in a range of 18° C. to 30° C. over a period of 15 seconds to 30 minutes; and cooling the film to 15° C. or lower.

In the case where the outlet temperature of the forming machine is set to a temperature higher than 200° C., the melt viscosity of the resin is very low, or, when the forming by inflation is carried out, since the resin cannot support its weight, it is difficult to continuously pull out the resulting film. In addition, when the forming is carried out using a T-die, the width of a melted film is narrow due to its surface tension after extrusion, or there occur problems that holes are opened in the film, and that the film is broken. Furthermore, it is not favorable to maintain the resin including a polydioxolane at a temperature higher than 200° C. for a long period of time, because the resin may be deteriorated and it may be difficult to keep the quality uniformity of the resulting film. In addition, in the case where the outlet temperature of the forming machine is lower than 50° C., since the melt viscosity of the resin is too high, the productivity of the film may be very poor. In the case where, immediately after extruded, the film is cooled to a temperature lower than 18° C., the crumbling period of the film in cold water becomes long. On the other hand, in the case where, after extruded, the film is maintained at a temperature higher than 30° C., the solidification of the film may be insufficient, or, since the film needs to be maintained at the temperature for a long period of time in order to a film having a desired crumbleability in cold water, the productivity may be low. In addition, in the case where the period over which the temperature of the extruded film is maintained in a range of 18° to 30° C. is shorter than 15 seconds, the crumbling period of the film in cold water becomes long. On the other hand, in the case where the period over which the temperature of the extruded film is maintained in a range of 18° to 30° C. is longer than 30 minutes, the productivity of the film may be low and the uniformity, surface smoothness, and extension of the film may also be low.

In the case where the film crumbly in cold water, relating to the present invention, is produced by subjecting the once formed film to thermal hysteresis, the film needs to be heated into a temperature range of 50° to 150° C. In the case where the heating temperature of the film is lower than this range, even if the subsequent steps are carried out, there is only obtained a film having a very slow rate at which it crumbles in cold water. On the other hand, in the case where the film is heated to a temperature higher than the above-mentioned range, since the melt viscosity of the film becomes very low, the film shape cannot be maintained.

Moreover, in the case where it is intended to use the film of the present invention as a film crumbly in cold water, the film preferably has a thickness of 10 to 250 μm, more preferably 30 to 150 μm. In the case where the thickness of the film is less than 10 μm, the strength of the film in practical use is very weak, and, in the case where the film thickness is more than 250 μm, the crumbling period of the film is long.

In addition, the film including a resin having a polydioxolane and the film crumbly in cold water, relating to the present invention, may be formed under conditions where various additives, such as stabilizers, nucleating agents, and fillers, are mixed into the films. In addition, the crumbling rate of the film in cold water can be controlled by adding hydrophilic organic and/or inorganic substances, such as polyethylene oxide, polyvinyl alcohol, superabsorbent resins, stearic acid salts, acetic acid salts, and carbonic acid salts, to the film.

BEST MODE FOR CARRYING OUT THE INVENTION

Figure 1:
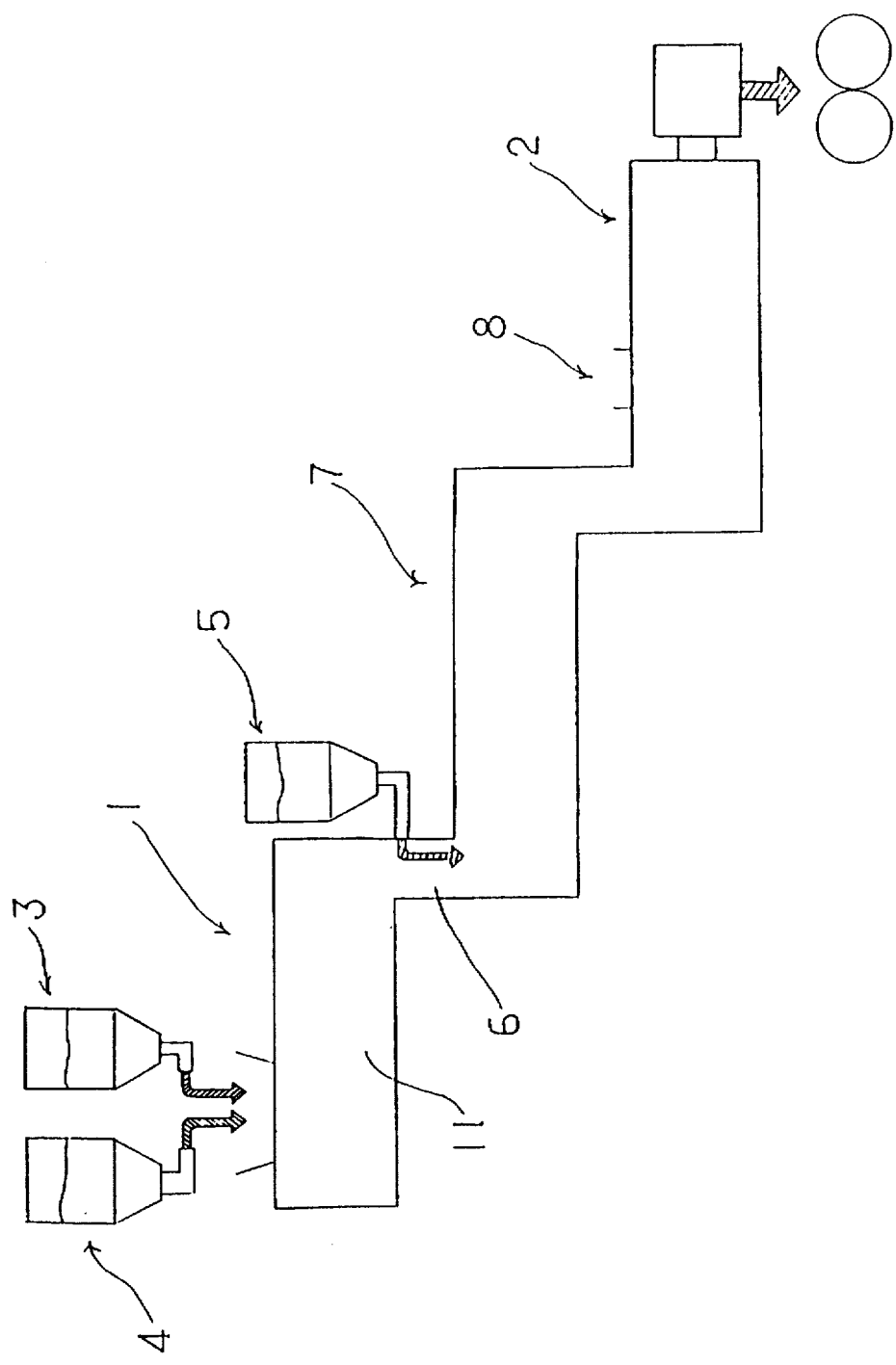
FIG. 1 is a summary view showing an example of the production apparatus of the present invention.
Figure 2:
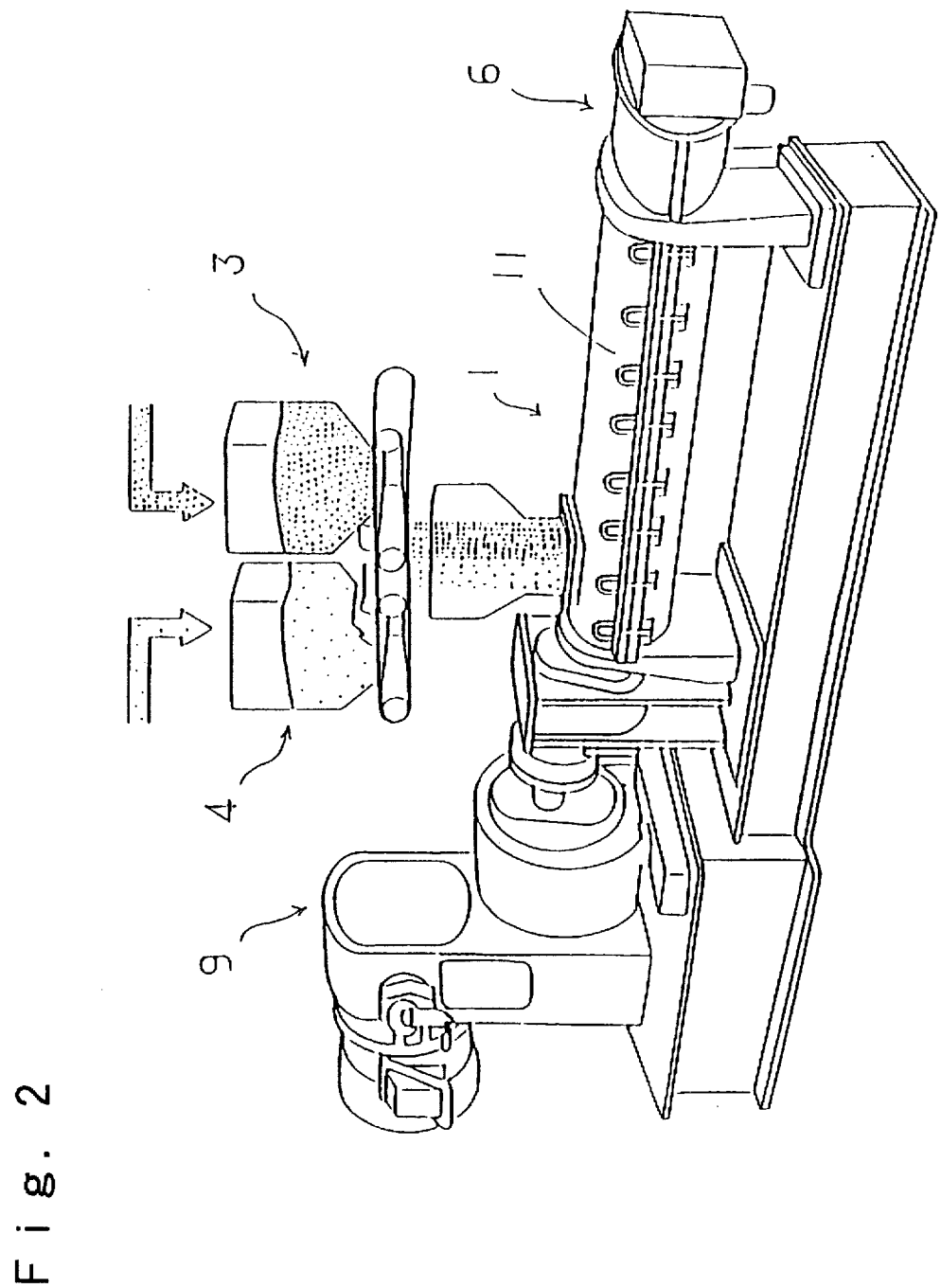
FIG. 2 is a perspective view showing a kneader in the apparatus of FIG. 1.
Figure 3:
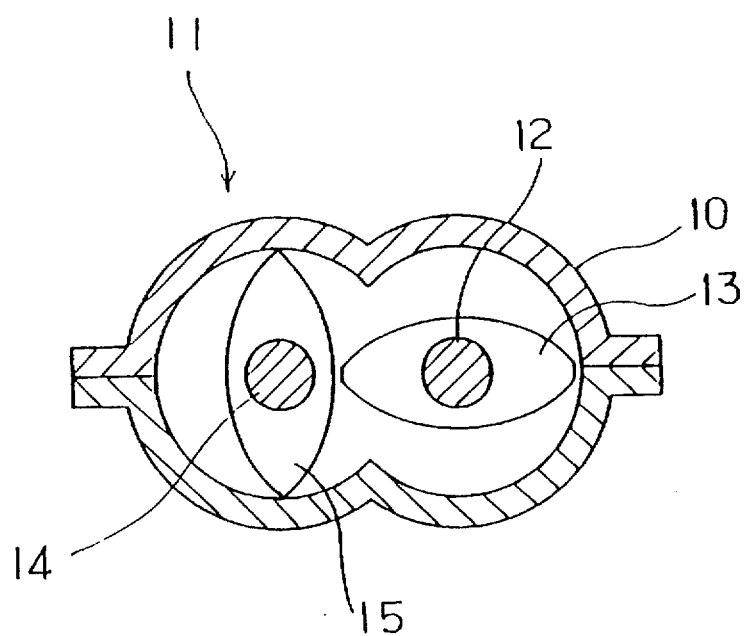
FIG. 3 is a vertical-sectional view showing a kneading part in the kneader of FIG. 2.

Hereinafter, this invention is illustrated by the following examples of some preferred embodiments. However, this invention is not limited to these examples.

EXAMPLE 1

Into a 100 ml flask equipped with a stirrer and a thermometer was placed 60 g of 1,3-dioxolane (obtained from Wako Pure Chemical Industries, Ltd.), and the flask was cooled to 0° C. While the contents of the flask were stirred, into the flask there was added a polymerization catalyst solution which had been prepared by dissolving into 0.5 g of acetone 0.03 g of phosphotungstic acid having a crystal water content of 4.2% by weight (the crystal water content was analyzed by TG-DTA using a TG/DTA instrument, hereinafter the same) which had been prepared by drying under reduced pressure at 120° C. for 20 hours: whereby a polymerization reaction was initiated. Three minutes after the addition of the polymerization catalyst solution, the polymerization peak temperature reached 54° C. by cooling the flask in an ice water bath. After the polymerization peak temperature was confirmed, the flask was heated in a warm water bath of 50° C. for 15 minutes. Then, into the resulting product of the polymerization reaction was added a neutralization solution which had been prepared by dissolving 0.08 g of triethyl amine into 5 g of 1,3-dioxolane. After the contents of the flask were stirred for 15 minutes, 1,3-dioxolane and triethyl amine were removed by distillation under reduced pressure, whereby a polydioxolane (1) of the present invention was obtained. The polydioxolane (1) had a yield of 45 g and a number-average molecular weight of 150,000 (the number-average molecular weight was measured by gel permeation chromatography using polystyrene as a standard substance, hereinafter the same). The polydioxolane (1) was made into a film. This film had softness, a tensile strength of 200 kg/cm$^2$, and an extension of 1100% (the tensile strength and the extension were measured in accordance with JIS K4127, hereinafter the same). The film crumbled in cold water and was soluble in warm water.

EXAMPLE 2

Into a 100 ml flask equipped with a stirrer and a thermometer was placed 60 g of 1,3-dioxolane (obtained from Wako Pure Chemical Industries, Ltd.), and the flask was cooled to 10° C. in a water bath. While the contents of the flask were stirred, into the flask was added a polymerization catalyst solution which had been prepared by dissolving into 0.25 g of methyl ethyl ketone 0.020 g of phosphotungstic acid having a crystal water content of 4.2% by weight which had been prepared by drying under reduced pressure at 120° C. for 20 hours: whereby a polymerization reaction was initiated. Heat was generated 3 minutes after the addition of the polymerization catalyst solution, and the polymerization peak temperature of 48° C. was shown 6 minutes after the addition of the polymerization catalyst solution. After the polymerization peak temperature was confirmed, the flask was heated in a warm water bath of 50° C. for 15 minutes. Then, into the resulting product of the polymerization reaction was added a neutralization solution which had been prepared by dissolving 0.10 g of diethyl amine into 5 g of 1,3-dioxolane. After the contents of the flask were stirred for 15 minutes, 1,3-dioxolane and diethyl amine were removed by distillation under reduced pressure, whereby a polydioxolane (2) of the present invention was obtained. The polydioxolane (2) had a yield of 38 g and a number-average molecular weight of 170,000. The polydioxolane (2) was made into a film. This film had softness, a tensile strength of 230 kg/cm$^2$, and an extension of 1500%. The film crumbled in cold water and was soluble in warm water.

COMPARATIVE EXAMPLE 1

The procedure of Example 1 was repeated except that 0.3 g of a 1.6% by weight methanol-methylene chloride solution of sodium methoxide was used as the neutralization solution; whereby a comparative polydioxolane (1) was obtained. The comparative polydioxolane (1) had a yield of 42 g and a number-average molecular weight of 40,000. The comparative polydioxolane (1) was made into a film. However, this film was very brittle, so its tensile strength test was impossible of execution.

COMPARATIVE EXAMPLE 2

The procedure of Example 1 was repeated except that no neutralization solution was used; whereby a comparative polydioxolane (2) was obtained. The comparative polydioxolane (2) had a yield of 41 g and a number-average molecular weight of 20,000. The comparative polydioxolane (2)

was made into a film. However, this film was very brittle, so its tensile strength test was impossible of execution.

EXAMPLE 3

Into a 100 ml flask equipped with a stirrer and a thermometer was placed 60 g of 1,3-dioxolane (obtained from Wako Pure Chemical Industries, Ltd.), and the flask was cooled to 10° C. While the contents of the flask were stirred, into the flask was added a mixture of 0.5 g of ethylene glycol dimethyl ether and a combined polymerization catalyst including 0.02 g of diacetone alcohol and 0.03 g of phosphotungstic acid having a crystal water content of 4.2% by weight (the crystal water content was analyzed by DTA, hereinafter the same) which had been prepared by drying under reduced pressure at 120° C. for 20 hours: whereby a polymerization reaction was initiated. Heat was generated 4 minutes after the addition of the combined polymerization catalyst, and the polymerization peak temperature of 45° C. was shown 8 minutes after the addition of the combined polymerization catalyst. After the polymerization peak temperature was confirmed, the flask was heated in a warm water bath of 50° C. for 15 minutes. Then, into the resulting polymerized product was added a neutralization solution which had been prepared by dissolving 0.08 g of triethyl amine into 5 g of 1,3-dioxolane. After the contents of the flask were stirred for 15 minutes, 1,3-dioxolane and triethyl amine were removed by distillation under reduced pressure, whereby a polydioxolane (3) of the present invention was obtained. The polydioxolane (3) had a yield of 40 g and a number-average molecular weight of 160,000 (the number-average molecular weight was measured by gel permeation chromatography using polystyrene as a standard substance, hereinafter the same). The polydioxolane (3) was made into a film. This film had softness, a tensile strength of 210 kg/cm$^1$ and an extension of 1200% (the tensile strength and the extension were measured in accordance with in K4127, hereinafter the same). The film crumbled in cold water and was soluble in warm water.

EXAMPLE 4

Into a 100 ml flask equipped with a stirrer and a thermometer was placed 60 g of 1,3-dioxolane (obtained from Wako Pure Chemical Industries, Ltd.), and the flask was cooled to 20° C. in a water bath. While the contents of the flask were stirred, into the flask was added a combined polymerization catalyst including a mixture of 0.25 g of acetone and 0.015 g of phosphotungstic and having a crystal water content of 4.2% by weight which had been prepared by drying under reduced pressure at 120° C. for 20 hours: whereby a polymerization reaction was initiated. Heat was generated 8 minutes after the addition of the combined polymerization catalyst, and the polymerization peak temperature of 25° C. was shown 1.4 minutes after the addition of the combined polymerization catalyst. After the polymerization peak temperature was confirmed, the flask was heated in a warm water bath of 50° C. for 15 minutes. Then, into the resulting polymerized product was added a neutralization solution which had been prepared by dissolving 0.07 g of triethyl amine into 5 g of 1,3-dioxolane. After the contents of the flask were stirred for 15 minutes, 1,3-dioxolane and triethyl amine were removed by distillation under reduced pressure, whereby a polydioxolane (4) of the present invention was obtained. The polydioxolane (4) had a yield of 30 g and a number-average molecular weight of 180,000. The polydioxolane (4) was made into a film. This film had softness, a tensile strength of 250 kg/ cm$^2$, and an extension of 1700%. The film crumbled in cold water and was soluble in warm water.

EXAMPLE 5

Into a 100 ml flask equipped with a stirrer and a thermometer was placed 60 g of 1,3-dioxolane (obtained from Wako Pure Chemical Industries, Ltd.), and the flask was cooled to 2° C. in an ice water bath. In addition, a liquid product having two (upper and lower) separate layers was obtained by mixing 1.2 g of ethylene glycol dimethyl ether and 0.06 g of phosphotungstic acid having a crystal water content of 6% by weight which had been prepared by drying under reduced pressure at 100° C. for 5 hours. While the contents of the flask were stirred, into the flask was added 0.05 ml of a phosphotungstic acid-ethylene glycol dimethyl ether-combined polymerization catalyst which was the lower layer of the above-mentioned liquid product and which contained phosphotungstic acid more than the upper layer of the above-mentioned liquid product: whereby a polymerization reaction was initiated. Heat was generated 15 seconds after the addition of the combined polymerization catalyst, and the polymerization peak temperature of 50° C. was shown 3 minutes after the addition of the combined polymerization catalyst. After the polymerization peak temperature was confirmed, the flask was heated in a warm water bath of 50° C. for 15 minutes. Then, into the resulting polymerized product was added a neutralization solution which had been prepared by dissolving 0.07 g of triethyl amine into 5 g of 1,3-dioxolane. After the contents of the flask were stirred for 15 minutes, 1,3-dioxolane and triethyl amine were removed by distillation under reduced pressure, whereby a polydioxolane (5) of the present invention was obtained. The polydioxolane (5) had a yield of 45 g and a number-average molecular weight of 200,000. The polydioxolane (5) was made into a film. This film had softness, a tensile strength of 260 kg/cm$^2$, and an extension of 1700%. The film crumbled in cold water and was soluble in warm water.

COMPARATIVE EXAMPLE 3

The procedure of Example 4 was repeated except that acetone was not used. As a result, phosphotungstic acid came into condition like fish eye, and, in such portions as fish eye, the polymerization occurred. However, unpolymerized portions remained, so a uniform polymerized product was not obtained.

<Synthesis of polydioxolane resin for producing film>

EXAMPLE 6

Into a four-necked flask equipped with a stirrer, a condenser, a thermometer and a nitrogen-introducing tube was placed 60.00 g of 1,3-dioxolane (obtained from Wako Pure Chemical Industries, Ltd.) which had been dried with molecular sieves which had been calcined at 500° C. The internal temperature of the flask was reduced to 3° C. using an ice water bath of 0° C. While the contents of the flask were stirred, into the flask was added 0.4 ml of a 5% by weight methyl ethyl ketone solution of phosphotungstic acid as a polymerization catalyst which had been prepared by drying under reduced pressure at 120° C. for 20 hour. The polymerization started immediately after the addition of the catalyst, and about 6 minutes later the exothermic peak reached 50° C. The ice water bath was displaced with a warm water bath of 50° C. to keep the reactor warm, whereby the resulting polymer was aged for 15 minutes. Then, 5 ml of a 1,3-dioxolane solution of triethyl amine having a concentration of 0.1% by weight was added into the reactor to stop the reaction.

The resulting polydioxolane had a number-average molecular weight of 110,000 which was measured by size-exclusion chromatography and calculated as polystyrene.

EXAMPLE 7

The procedure of Example 6 was repeated except that 1,3-dioxolane (obtained from Osaka Organic Chemical Industries, Ltd.) was used and that the amount of the polymerization catalyst solution was changed to 0.6 ml; whereby polymerization was carried out. The polymerization started immediately after the addition of the catalyst, and about 6 minutes later the exothermic peak reached 55° C. The subsequent aging and the neutralization of the catalyst were also carried out in the same way as of Example 6.

The resulting polydioxolane had a number-average molecular weight of 150,000 which was measured by size-exclusion chromatography and calculated as polystyrene.

EXAMPLE 8

The procedure of Example 6 was repeated except that the amount of the polymerization catalyst was changed to 0.3 ml; whereby polymerization was carried out. The polymerization started immediately after the addition of the catalyst, and about 6 minutes later the exothermic peak reached 45° C. The subsequent aging and the neutralization of the catalyst were also carried out in the same way as of Example 6.

The resulting polydioxolane had a number-average molecular weight of 230,000 which was measured by size-exclusion chromatography and calculated as polystyrene.

EXAMPLE 9

The procedure of Example 6 was repeated except that 1,3-dioxolane (obtained from Osaka Organic Chemical Industries, Ltd.), which had been dried using molecular sieves dried at 500° C. and then been distilled, was used, and that the amount of the polymerization catalyst was changed to 0.3 ml; whereby polymerization was carried out. The polymerization started immediately after the addition of the catalyst, and about 3 minutes later the exothermic peak reached 60° C. The subsequent aging and the neutralization of the catalyst were also carried out in the same way as of Example 6.

The resulting polydioxolane had a number-average molecular weight of 300,000 which was measured by size-exclusion chromatography and calculated as polystyrene.

EXAMPLE 10

Into a four-necked flask equipped with a stirrer, a condenser, a thermometer and a nitrogen-introducing tube was placed 60.00 g of 1,3-dioxolane (obtained from Wako Pure Chemical Industries, Ltd.). The internal temperature of the flask was adjusted to 30° C. using a water bath of 30° C. While the contents of the flask were stirred, into the flask was added 0.6 ml of a 5% by weight methyl ethyl ketone solution of phosphotungstic acid as a polymerization catalyst which had been prepared by drying under reduced pressure at 120° C. for 20 hour. The polymerization started immediately after the addition of the catalyst, and about 15 minutes later the exothermic peak reached 45° C. The water bath was displaced with a warm water bath of 50° C. to keep the reactor warm, whereby the resulting polymer was aged for 15 minutes. Then, 5 ml of a 1,3-dioxolane solution of triethyl amine having a concentration of 0.1% by weight was added into the reactor to stop the reaction.

The resulting polydioxolane had a number-average molecular weight of 40,000 which was measured by size-exclusion chromatography and calculated as polystyrene.

EXAMPLE 11

The procedure of Example 6 was repeated except that 1,3-dioxolane (obtained from Osaka Organic Chemical Industries, Ltd.), which had been dried using molecular sieves dried at 500° C. and then been distilled, was used, and that the amount of the polymerization catalyst was changed to 0.1 ml; whereby polymerization was carried out. The polymerization started immediately after the addition of the catalyst, and about 3 minutes later the exothermic peak reached 60° C. The subsequent aging and the neutralization of the catalyst were also carried out in the same way as of Example 6.

The resulting polydioxolane had a number-average molecular weight of 550,000 which was measured by size-exclusion chromatography and calculated as polystyrene.

EXAMPLE 12

Into a four-necked flask equipped with a stirrer, a condenser, a thermometer and a nitrogen-introducing tube was placed 60.00 g of 1,3-dioxolane (obtained from Wako Pure Chemical Industries, Ltd.). The internal temperature of the flask was reduced to 3° C. using an ice water bath of 0° C. While the contents of the flask were stirred, into the flask was added 0.6 ml of a 5% by weight methyl ethyl ketone solution of phosphotungstic acid as a polymerization catalyst which had been prepared by drying under reduced pressure at 120° C. for 20 hour. The polymerization started immediately after the addition of the catalyst, and about 6 minutes later the exothermic peak reached 55° C. The ice water bath was displaced with a warm water bath of 50° C. to keep the reactor warm, whereby the resulting polymer was aged for 15 minutes. Then, 5 ml of a 1,3-dioxolane solution of triethyl amine having a concentration of 0.1% by weight was added into the reactor to stop the reaction.

The resulting polydioxolane had a number-average molecular weight of 70,000 which was measured by size-exclusion chromatography and calculated as polystyrene.

EXAMPLE 13

The procedure of Example 12 was repeated except that 1,3-dioxolane (obtained from Osaka Organic Chemical Industries, Ltd.), which had been dried using molecular sieves dried at 500° C. and then been distilled, was used, and that the amount of the polymerization catalyst was changed to 0.2 ml; whereby polymerization was carried out. The polymerization started immediately after the addition of the catalyst, and about 3 minutes later the exothermic peak reached 52° C. The subsequent aging and the neutralization of the catalyst were also carried out in the same way as of Example 12.

The resulting polydioxolane had a number-average molecular weight of 400,000 which was measured by size-exclusion chromatography and calculated as polystyrene.

EXAMPLE 14

An S2-model KRC kneader (L/D=13.2) made by Kurimoto, Ltd. was used, and its jacket temperature was set to 40° C. and its shaft-rotation velocity was set to 38 rpm.

From an addition inlet was supplied 1,3-dioxolane at a rate of 7 kg/hr, and from a polymerization catalyst-supplying nozzle arranged 3 cm above a monomer surface was dropwise added a 5% by weight methyl ethyl ketone solution of phosphotungstic acid as a polymerization catalyst at a rate of 3 ml/hr. The polymerization started immediately after the addition of 1,3-dioxolane and the polymerization catalyst solution. About 10 minutes later a valve of a discharging outlet was opened, whereby the resulting polydioxolane having a high viscosity was discharged. The discharged polymer was added into a batch type 2L-kneader having a Banbury-type stirring paddle every 10 minutes, and stirred together with 100 g of a 1% by weight 1,3-dioxolane solution of triethyl amine, whereby the polymerization catalyst was deactivated. The kneader was operated for 1 hour to obtain about 6.9 kg of an undried polymer, and this polymer was dried for 5 hours using a vacuum oven of 100° C.

The yield of the resulting polydioxolane was about 6.0 kg.
<Production of hydrophilic film>

EXAMPLE 15

The polydioxolane, obtained in Example 6 and having a number-average molecular weight of 110,000 calculated as polystyrene, was extruded into a film shape using a CS-194AV max mixing extruder (made by Custom Scientific Instruments Co., Ltd.) under conditions where the rotor temperature was 100° C., the shaft-rotation velocity was 120 rpm, the T-die temperature was 115° C., and the T-die clearance was 0.5 mm. While the extruded film was extended to two times, compressed air of 5° C. was blown to the film to cool it to 15° C. in about 10 seconds, whereby a film 1 was obtained.

EXAMPLE 16

The procedure of Example 15 was repeated except that the polydioxolane, obtained in Example 7 and having a number-average molecular weight of 150,000 calculated as polystyrene, was used, and that the extruded film was extended to four times; whereby a film 2 was obtained.

EXAMPLE 17

The procedure of Example 15 was repeated except that the polydioxolane, obtained in Example 8 and having a number-average molecular weight of 230,000 calculated as polystyrene, was used, and that the extruded film was extended to four times; whereby a film 3 was obtained.

EXAMPLE 18

The procedure of Example 16 was repeated except that the temperature of compressed air for cooling was 0° C., and that the film was cooled to 15° C. in about 1 minute; whereby a film 4 was obtained.

EXAMPLE 19

The procedure of Example 16 was repeated except that the temperature of compressed air for cooling was 15° C., and that the film was cooled to 16° C. in about 3 minute; whereby a film 5 was obtained.

EXAMPLE 20

The procedure of Example 15 was repeated except that the polydioxolane, obtained in Example 9 and having a number-average molecular weight of 300,000 calculated as polystyrene, was used, and that the extruded film was extended to four times; whereby a film 6 was obtained.

COMPARATIVE EXAMPLE 4

It was intended to obtain a film by repeating the procedure of Example 15 except that the polydioxolane, obtained in Example 10 and having a number-average molecular weight of 40,000 calculated as polystyrene, was used. However, since the extruded film was very brittle, it could not be extended to two times. Thus, the extension of the extruded film was not carried out, whereby a comparative film 1 was obtained.

COMPARATIVE EXAMPLE 5

It was intended to obtain a film by repeating the procedure of Example 16 except that the polydioxolane, obtained in Example 11 and having a number-average molecular weight of 550,000 calculated as polystyrene, was used. However, the machine stopped due to power deficiency of the extruder.

COMPARATIVE EXAMPLE 6

It was intended to obtain a film by repeating the procedure of Example 16 except that the T-die temperature was 45° C. However, since the melted condition of the resin in the T-die was ununiform, a homogeneous film could not be obtained. In addition, 5 minutes after the initiation of the experiment, the machine stopped due to power deficiency of the extruder.

COMPARATIVE EXAMPLE 7

It was intended to obtain a film by repeating the procedure of Example 16 except that the T-die temperature was 220° C. However, since the melt viscosity of the resin was very low and the resin, which was extruded from the T-die, flowed like thread, a film could not be obtained.

COMPARATIVE EXAMPLE 8

The procedure of Example 16 was repeated except that the temperature of compressed air for cooling was changed to 30° C. to cool the film to 40° C. in about 7 minute, and that compressed air of 0° C. was then blown to the film to further cool it to 3° C.; whereby a comparative film 5 was obtained.

COMPARATIVE EXAMPLE 9

The procedure of Example 16 was repeated except that while the extruded film was extended to 2 times, it was immediately brought into contact with a stainless-made drum of −20° C. to cool the film to −18° C.; whereby a film of Comparative Example 9 was obtained. While the resulting film was handled at room temperature in order to take out a test piece from the film, white spots appeared on the film due to its further crystallization.

<Results>

As to the resulting films, in Table 1 are shown the thickness, the spherulite's size, and the tensile fracture strength and the tensile fracture extension in a direction of the apparatuses.

The film evaluation shown in Table 1 was carried out as follows.

<Measurement of crystallinity>

The crystallinity was measured using a wide-angle X-ray diffraction apparatus RAD-rC system.

<Measurement of spherulite's size>

The spherulite's size was determined by simply averaging diameters of 100 spherical crystals using a polarizing microscope.

<Tensile strength and tensile fracture extension>

The tensile strength and the tensile fracture extension were measured at a test rate E of 20 mm per minute using a #1 type test piece in accordance with JIS K-7127.

TABLE 1

| Film | Film thickness (μm) | Spherulite's size (%) | Crystallinity (%) | Tensile fracture strength (Kgf/cm²) | Tensile fracture extension (%) | Note |
|---|---|---|---|---|---|---|
| 1 | 110 | not observed | 37 | 150 | 150 | |
| 2 | 150 | not observed | 40 | 170 | 500 | |
| 3 | 80 | not observed | 38 | 200 | 700 | |
| 4 | 120 | not observed | 35 | 190 | 1000 | |
| 5 | 130 | 150 | 32 | 220 | 500 | |
| 6 | 150 | not observed | 38 | 300 | 1200 | |
| Comparative 1 | 300 | not observed | 40 | 50 | 20 | |
| Comparative 2 | — | — | — | — | — | Film not formed |
| Comparative 3 | — | — | — | — | — | Film not formed |
| Comparative 4 | — | — | — | — | — | Film not formed |
| Comparative 5 | 110 | 800 | 35 | 150 | 10 | |
| Comparative 6 | 120 | 100 | 29 | 200 | 400 | Spots present |

<Production of film crumbly in cold water>

EXAMPLE 21

The polydioxolane, obtained in Example 12 and having a number-average molecular weight of 70,000 calculated as polystyrene, was extruded into a film shape using a CS-194AV max mixing extruder (made by Custom Scientific Instruments Co., Ltd.) under conditions where the rotor temperature was 100° C., the shaft-rotation velocity was 120 rpm, the T-die temperature was 115° C., and the T-die clearance was 0.5 mm. While the extruded film was extended to two times, compressed air of 20° C. was blown to the film to cool it to 22° C. in about 3 minutes, and then compressed air of 10° C. was blown to the film to cool it to 12° C.; whereby a film 7 was obtained.

EXAMPLE 22

The polydioxolane, obtained in Example 7 and having a number-average molecular weight of 150,000 calculated as polystyrene, was made into a film under the same film-formation apparatus-setting conditions as of Example 21. While the extruded film was extended to four times, compressed air of 15° C. was blown to the film to cool it to 20° C. in about 30 seconds, and then compressed air of 10° C. was blown to the film to cool it to 12° C.; whereby a film 8 was obtained.

EXAMPLE 23

The polydioxolane, obtained in Example 8 and having a number-average molecular weight of 230,000 calculated as polystyrene, was made into a film under the same film-formation apparatus-setting conditions as of Example 21. While the extruded film was extended to four times, compressed air of 15° C. was blown to the film to cool it to 20° C. in about 1 minute, and then compressed air of 10° C. was blown to the film to cool it to 12° C.; whereby a film 9 was obtained.

EXAMPLE 24

The polydioxolane, obtained in Example 7 and having a number-average molecular weight of 150,000 calculated as polystyrene, was made into a film under the same film-formation apparatus-setting conditions as of Example 21. While the extruded film was extended to two times, compressed air of 5° C. was blown to the film to cool it to 15° C. in about 10 seconds, whereby a film (which was not yet subjected to thermal hysteresis) was obtained.

After this film was maintained at 70° C. for 3 minutes, compressed air of 15° C. was blown to the film to cool it to 20° C. in about 1 minute, and then compressed air of 10° C. was blown to the film to cool it to 12° C.; whereby a film 10 was obtained.

EXAMPLE 25

A film which was not yet subjected to thermal hysteresis was obtained in the same way as of Example 24.

After this film was maintained at 100° C. for 1 minute, compressed air of 15° C. was blown to the film to cool it to 20° C. in about 1 minute, and then compressed air of 10° C. was blown to the film to cool it to 12° C.; whereby a film 11 was obtained.

COMPARATIVE EXAMPLE 10

It was intended to obtain a film by repeating the procedure of Example 21 except that the polydioxolane, obtained in Example 10 and having a number-average molecular weight of 40,000 calculated as polystyrene, was used. However, since the extruded film was very brittle, it could not be extended to two times. Thus, a film was made by press-forming the polydioxolane using a 37 t thermal press under a ram pressure of 150 kgf/cm² at 80° C., and this film was cooled at 30° C. for 1 minute and then further cooled to 10° C.; whereby a comparative film 7 was obtained.

COMPARATIVE EXAMPLE 11

The procedure of Example 21 was repeated except that the polydioxolane, obtained in Example 13 and having a number-average molecular weight of 400,000 calculated as polystyrene, was used; whereby a comparative film 8 was obtained.

COMPARATIVE EXAMPLE 12

A film which was not yet subjected to thermal hysteresis was obtained in the same way as of Example 24.

This film was maintained at 80° C. for 30 minutes, compressed air of 30° C. was blown to the film to cool it to 30° C., the film was maintained at 30° C. for about 1 hour, and then compressed air of 10° C. was blown to the film to cool it to 12° C.; whereby a comparative film 9 was obtained.

COMPARATIVE EXAMPLE 13

A film which was not yet subjected to thermal hysteresis was obtained in the same way as of Example 24.

This film was maintained at 45° C. for 1 hour, compressed air of 15° C. was blown to the film to cool it to 20° C. in about 1 minute, and then compressed air of 10° C. was blown to the film to cool it to 12° C.; whereby a comparative film 10 was obtained.

COMPARATIVE EXAMPLE 14

A film which was not yet subjected to thermal hysteresis was obtained in the same way as of Example 24.

Although this film was maintained at 180° C., since the melt viscosity of the film was too low, the shape of the film could not be kept.

COMPARATIVE EXAMPLE 15

A film which was not yet subjected to thermal hysteresis was obtained as a comparative film 12 in the same way as of Example 24.

<Results>

As to the resulting films, in Table 2 are shown the thickness, the tensile fracture strength and the tensile fracture extension in a direction of the apparatuses, and the crumbling period in cold water.

The film evaluation shown in Table 2 was carried out as follows.

<Tensile strength and tensile fracture extension>

The tensile strength and the tensile fracture extension were measured at a test rate E of 20 mm per minute using a #1 type test piece in accordance with JIS K-7127.

<Measurement of crumbling rate>

The film of 9 cm in diameter was placed on a Büchner funnel fixed in a mouth of a suction bottle, and the internal pressure of the bottle was reduced to 1 mmHg using a vacuum pump. Under this condition, 100 ml of cold water of 30° C. was poured onto the Büchner funnel—this time was defined as a starting point 0—, and a period—that passed from this starting point till the film was broken and cold water began falling down into the suction bottle—was defined as the crumbling period.

TABLE 2

| Film | Film thickness (μm) | Tensile fracture strength (Kgf/cm²) | Tensile fracture extension (%) | Crumbling rate in cold water (minute) | Note |
|---|---|---|---|---|---|
| 7 | 110 | 80 | 200 | 1 | |
| 8 | 150 | 180 | 300 | 12 | |
| 9 | 120 | 200 | 400 | 15 | |
| 10 | 150 | 150 | 250 | 8 | |
| 11 | 150 | 180 | 300 | 12 | |
| Comparative 7 | 300 | 50 | 10 | 0 | |
| Comparative 8 | 180 | 250 | 800 | 1 hour or longer | |
| Comparative 9 | 150 | 170 | 450 | 1 hour or longer | |
| Comparative 10 | 150 | 170 | 500 | 1 hour or longer | |
| Comparative 11 | — | — | — | — | Film not formed |
| Comparative 12 | 150 | 170 | 500 | 1 hour or longer | |

<Synthesis of polydioxolane using KRC kneader>
—Calculation of reaction yield—

$$\text{Yield (\%)} = \frac{\text{Weight after drying (g)}}{\text{Weight before drying (g)} - \text{Deactivator solution weight (g)}} \times 100$$

EXAMPLE 26

An S2-model KRC kneader (L/D=13.2) made by Kurimoto, Ltd. was used, and its jacket temperature was set to 20° C. and its shaft-rotation velocity was set to 96 rpm. From an addition inlet was supplied 1,3-dioxolane (obtained from Osaka Organic Chemical Industries, Ltd.) at a rate of 10 kg/hr, and from a polymerization catalyst-supplying nozzle arranged 3 cm above a monomer surface was dropwise added a 5% by weight methyl ethyl ketone solution of phosphotungstic acid as a polymerization catalyst at a rate of 6 ml/ hr. The polymerization immediately started locally from a part onto which drops of the polymerization catalyst solution fell down. About 5 minutes after the addition of the polymerization catalyst solution was initiated, a valve of a discharging outlet was opened, whereby the resulting polydioxolane having a high viscosity was discharged. The discharged polymer was added into a batch type 2L-kneader having a Banbury-type stirring paddle every 10 minutes, and stirred together with 100 g of a 1% by weight 1,3-dioxolane solution of triethyl amine, whereby the polymerization catalyst was deactivated. The kneader was operated for 1 hour to obtain about 10.1 kg of an undried polymer, and this polymer was dried for 5 hours using a vacuum oven of 100° C.; whereby a polydioxolane 26 was obtained in a yield of about 8.2 kg.

EXAMPLE 27

An S2-model KRC kneader (L/D=13.2) made by Kurimoto, Ltd. was used, and its jacket temperature was set to 20° C. and its shaft-rotation velocity was set to 38 rpm. 1,3-dioxolane (obtained from Osaka Organic Chemical Industries, Ltd.) was supplied from an addition inlet at a rate of 10 kg/hr, and a 5% by weight methyl ethyl ketone solution of phosphotungstic acid as a polymerization catalyst was added at a rate of 6 ml/hr in the same way as of Example 26. The polymerization started immediately after the addition of 1,3-dioxolane and the polymerization catalyst solution. About 5 minutes later a valve of a discharging outlet was opened, whereby the resulting polydioxolane having a high viscosity was discharged. The discharged polymer was added into a batch type 2L-kneader having a Banbury-type stirring paddle every 10 minutes, and stirred together with 100 g of a 1% by weight 1,3-dioxolane solution of triethyl amine, whereby the polymerization catalyst was deactivated. The kneader was operated for 1 hour to obtain about 9.8 kg of an undried polymer, and this polymer was dried for 5 hours using a vacuum oven of 100° C.; whereby a polydioxolane 27 was obtained in a yield of about 8.3 kg.

EXAMPLE 28

An S2-model KRC kneader (L/D=13.2) made by Kurimoto, Ltd. was used, and its jacket temperature was set to 40° C. and its shaft-rotation velocity was set to 38 rpm. 1,3-dioxolane (obtained from Osaka Organic Chemical Industries, Ltd.) was supplied from an addition inlet at a rate of 7 kg/hr, and a 5% by weight methyl ethyl ketone solution of phosphotungstic acid as a polymerization catalyst was added at a rate of 3 ml/hr in the same way as of Example 26. The polymerization started immediately after the addition of 1,3-dioxolane and the polymerization catalyst solution. About 10 minutes later a valve of a discharging outlet was opened, whereby the resulting polydioxolane having a high viscosity was discharged. The discharged polymer was added into a batch type 2L-kneader having a Banbury-type stirring paddle every 10 minutes, and stirred together with 100 g of a 1% by weight 1,3-dioxolane solution of triethyl amine, whereby the polymerization catalyst was deactivated. The kneader was operated for 1 hour to obtain about 6.9 kg of an undried polymer, and this polymer was dried for 5 hours using a vacuum oven of 100° C.; whereby a polydioxolane 28 was obtained in a yield of about 6.0 kg.

EXAMPLE 29

An S2-model KRC kneader (L/D=13.2) made by Kurimoto, Ltd. was used, and its jacket temperature was set to 40° C. and its shaft-rotation velocity was set to 45 rpm. 1,3-dioxolane (obtained from Osaka Organic Chemical Industries, Ltd.) was supplied from an addition inlet at a rate of 10 kg/hr, and a 5% by weight methyl ethyl ketone solution of phosphotungstic acid as a polymerization catalyst was added at a rate of 10 ml/hr in the same way as of Example 26. The polymerization started immediately after the addition of 1,3-dioxolane and the polymerization catalyst solution. About 1 minute later a valve of a discharging outlet was opened, whereby the resulting polydioxolane having a high viscosity was discharged. The discharged polymer was added into another S2-model KRC kneader (L/D=7.6), and a 0.1% by weight 1,3-dioxolane solution of triethyl amine was then added at a rate of 0.5 kg/hr from the same addition inlet that the polymer was added from; whereby the polymerization catalyst was deactivated. The kneader was operated for 1 hour to obtain about 9.5 kg of an undried polymer, and this polymer was dried for 5 hours using a vacuum oven of 100° C.; whereby a polydioxolane 29 was obtained in a yield of about 8.4 kg.

EXAMPLE 30

The procedure of Example 26 was repeated except that a 1M dichloromethane solution of triethyloxonium tetrafluoroborate was added as the polymerization catalyst at a rate of 10 ml/ hr; whereby about 9.5 kg of an undried polymer was obtained. Then, this polymer was dried for 5 hours using a vacuum oven of 100° C.; whereby a polydioxolane 30 was obtained in a yield of about 8.0 kg.

EXAMPLE 31

The procedure of Example 26 was repeated except that a 2M hexane solution of triethylaluminum as well as concentrated sulfuric acid were added as the polymerization catalysts at a rate of 3 ml/hr and at a rate of 1 ml/hr respectively; whereby about 9.5 kg of an undried polymer was obtained. Then, this polymer was dried for 5 hours using a vacuum oven of 100° C.; whereby a polydioxolane 31 was obtained in a yield of about 7.6 kg.

EXAMPLE 32

The procedure of Example 28 was repeated except that a mixture of 80 parts by weight of 1,3-dioxolane (obtained from Osaka Organic Chemical Industries, Ltd.) and 20 parts by weight of $\epsilon$-caprolactone was used as the monomer; whereby about 7.2 kg of an undried polymer was obtained. Then, this polymer was dried for 5 hours using a vacuum oven of 100° C.; whereby a polydioxolane 32 was obtained in a yield of about 5.3 kg.

EXAMPLE 33

The procedure of Example 28 was repeated except that a mixture of 90 parts by weight of 1,3-dioxolane (obtained from Osaka Organic Chemical Industries., Ltd.) and 10 parts by weight of 2-methyl-1,3-dioxolane was used as the monomer; whereby about 7.0 kg of an undried polymer was obtained. Then, this polymer was dried for 5 hours using a vacuum oven of 100° C.; whereby a polydioxolane 33 was obtained in a yield of about 4.8 kg.

EXAMPLE 34

The procedure of Example 28 was repeated except that a mixture of 98 parts by weight of 1,3-dioxolane (obtained from Osaka Organic Chemical Industries, Ltd.) and 2 parts by weight of 2-phenyl-1,3-dioxolane was used as the monomer; whereby about 7.2 kg of an undried polymer was obtained. Then, this polymer was dried for 5 hours using a vacuum oven of 100° C.; whereby a polydioxolane 34 was obtained in a yield of about 4.6 kg.

EXAMPLE 35

The procedure of Example 28 was repeated except that a mixture of 90 parts by weight of 1,3-dioxolane (obtained from Osaka Organic Chemical Industries, Ltd.) and 10 parts by weight of styrene was used as the monomer; whereby about 7.3 kg of an undried polymer was obtained. Then, this polymer was dried for 5 hours using a vacuum oven of 100° C.; whereby a polydioxolane 35 was obtained in a yield of about 4.7 kg.

COMPARATIVE EXAMPLE 16

Into a 200 ml four-necked flask equipped with a condenser, a stirrer, a nitrogen-introducing tube and a thermometer was placed 100 g of 1,3-dioxolane (obtained from Osaka Organic Chemical Industries, Ltd.). The flask was cooled in a cold water bath of 0° C. When the temperature of 1,3-dioxolane fell down to 3° C., while the contents of the flask were stirred, 0.1 ml of a 5% by weight methyl ethyl ketone solution of phosphotungstic acid was added as a polymerization catalyst into the flask. The polymerization started in the entire reaction system immediately after the addition of the catalyst, and, although the reaction started at a low temperature of 3° C., 1,3-dioxolane refluxed due to rapid and intensive heat-generation, and part of 1,3-dioxolane spouted from a top of the condenser, while the viscosity of the reaction system rapidly increased and the exothermic peak reached 82° C. in about 30 seconds. Then, the reaction was continued for 3 minutes, and the resulting polydioxolane of Comparative Example 16 was taken out. However, about 25 g of the polydioxolane remained in the flask, because its viscosity was very high.

Five grams of a 1,3-dioxolane solution of triethyl amine having a concentration of 0.1% by weight was added into about 75 g of the obtained polydioxolane to deactivate the polymerization catalyst, and then the polydioxolane was dried for 5 hours using a vacuum oven of 100° C.; whereby a comparative polydioxolane 16-a was obtained in a yield of about 65 g.

Next, 75 g of 1,3-dioxolane (obtained from Osaka Organic Chemical Industries, Ltd.) was further supplied into the flask, and then 0.75 ml of the polymerization catalyst was added into the flask; whereby the polymerization was carried out. The reaction was milder than the first batch, and almost no heat was generated for 5 minutes after the addition of the polymerization catalyst. The temperature gradually rose with the heat-generation from 5 minutes after the addition of the polymerization catalyst, and the exothermic peak reached 45° C. in 13 minutes after the addition of the polymerization catalyst. Then, the reaction was continued for 3 minutes, and the resulting polydioxolane was taken out. However, about 10 g of the polydioxolane remained in the flask, because its viscosity was high.

Five grams of a 1,3-dioxolane solution of triethyl amine having a concentration of 0.1% by weight was added into about 90 g of the obtained polydioxolane to deactivate the polymerization catalyst, and then the polydioxolane was dried for 5 hours using a vacuum oven of 100° C.; whereby a comparative polydioxolane 16-b was obtained in a yield of about 60 g.

COMPARATIVE EXMAPLE 17

The polymerization was carried out under the same conditions as of Example 26. However, the procedure of Example 26, wherein the polymerization catalyst was deactivated every 10 minutes using the 2L-kneader, was not carried out for the discharged polymer, and this polymer was, as it was, left in a 20L-kneader until the operation of the KRC kneader finished. The operation of the KRC kneader finished in 1.5 hours, and the polymer that was discharged into the 20L-kneader during the operation of the KRC kneader was kept at room temperature for 30 minutes, and then 900 g of a 1% by weight 1,3-dioxolane solution of triethyl amine was added to the polymer to deactivate the polymerization catalyst at once. The subsequent drying was carried out in the same way as of Example 26. About 15.2 kg of the resulting undried polymer was dried for 5 hours using a vacuum oven of 100° C.; whereby a polydioxolane of Comparative Example 17 was obtained in a yield of about 12.1 kg.

COMPARATIVE EXAMPLE 18

The procedure of Example 28 was repeated except that a mixture of 40 parts by weight of 1,3-dioxolane and 60 parts by weight of ε-caprolactone was used as the monomer; whereby about 7.2 kg of an undried polymer was obtained. Then, this polymer was dried for 5 hours using a vacuum oven of 100° C.; whereby a polydioxolane of Comparative Example 18 was obtained in a yield of about 3.6 kg.

COMPARATIVE EXAMPLE 19

The procedure of Example 26 was repeated except that a 5% by weight methyl ethyl ketone solution of phosphotungstic acid was added as the polymerization catalyst at a rate of 0.6 ml/hr; whereby the polymerization of 1,3-dioxolane was tried. However, the polymerization reaction did not start, and the monomer was discharged in unreacted condition from the discharging outlet.

COMPARATIVE EXAMPLE 20

The procedure of Example 26 was repeated except that a 5% by weight methyl ethyl ketone solution of phosphotungstic acid was added as the polymerization catalyst at a rate of 1500 ml/hr; whereby the polymerization of 1,3-dioxolane was tried. However, the reaction very intensively progressed at the monomer-supplying inlet, and the viscosity-increased and foamed polymer bulged and entirely covered the supplying inlet, so the reaction could not continuously be carried out.

COMPARATIVE EXAMPLE 21

The procedure of Example 26 was repeated except that a 0.5% by weight methyl ethyl ketone solution of phosphotungstic acid was added as the polymerization catalyst at a rate of 60 ml/hr; whereby the polymerization of 1,3-dioxolane was tried. However, the polymerization reaction did not start, and the monomer was discharged in unreacted condition from the discharging outlet 6.

<Results>

In Table 3 are shown the reaction yield and the number-average molecular weight, measured by size-exclusion chromatography and calculated as polystyrene, of the obtained polydioxolanes.

TABLE 3

| Polydioxolane | Reaction yield (%) | Number-average molecular weight |
|---|---|---|
| 26 | 86 | 180,000 |
| 27 | 90 | 200,000 |
| 28 | 95 | 200,000 |
| 29 | 93 | 150,000 |
| 30 | 90 | 170,000 |
| 31 | 85 | 130,000 |
| 32 | 80 | 110,000 |
| 33 | 75 | 85,000 |
| 34 | 70 | 70,000 |
| 35 | 70 | 100,000 |
| Comparative 16-a | 87 | 210,000 |
| Comparative 16-b | 67 | 30,000 |
| Comparative 16 total | 76 | — |
| Comparative 17 | 85 | 80,000 |
| Comparative 18 | 55 | 30,000 |

TABLE 3-continued

| Polydioxolane | Reaction yield (%) | Number-average molecular weight |
|---|---|---|
| Comparative 19 | — | — |
| Comparative 20 | — | — |
| Comparative 21 | — | — |

INDUSTRIAL APPLICATION

In the present invention, 1,3-dioxolane can mildly be polymerized on an industrial scale, whereby a high-molecular-weight polydioxolane can be obtained with good reproductivity. In addition, the polymerization catalyst used in the present invention has almost no corrosion and is hardly influenced by water present in environment, so the polymerization can be carried out using an inexpensive polymerization apparatus.

Since the polydioxolane obtained by the process of the present invention has a high molecular weight, it can form a film having high strength. In addition, this polydioxolane can be used for wrapping films, fiber-treating agents, thickeners, plasticizers, and so on, by utilizing its properties, such as crumbleability in cold water and solubility in warm water.

The film including a resin including a polydioxolane, according to an embodiment of the present invention, has good mechanical properties and good surface smoothness. In addition, the film of the present invention is very excellent in stability under high humidity environments. That is to say, although the film of the present invention has high hydrophilicity, it hardly occurs problems of: deterioration of mechanical properties due to moisture absorption; deterioration of handling properties due to the curling of the film; surface tackiness; and so on; these problems being involved with films including other hydrophilic polymers, such as polyethylene oxide and polyvinyl alcohol.

In addition, since the film of the present invention further has very high water-resistance, even if it comes into contact with water, it hardly occurs problems of: swelling; hole-opening; and so on; these problems being involved with films including polyethylene oxide or polyvinyl alcohol. Thus, the film of the present invention is differentiated from the conventional films including the above-mentioned hydrophilic polymers, because the film of the present invention has excellent properties whereby moistureproof and waterproof management is not needed during transportation and use.

In addition, the cold water-crumbly film including a resin including a polydioxolane, according to another embodiment of the present invention, has excellent mechanical properties as a film and a property whereby the film crumbles in cold water, these properties differentiating the film of the present invention from conventional water-soluble polymers, such as polyethylene glycol and polyvinyl alcohol. When the film is used as a water-soluble wrapping materials for medicine, agricultural chemicals, detergents, and so on, it is particularly advantageous that the film does not dissolve like the conventional water-soluble polymers, but crumbles.

The production apparatus and the production process of the present invention make it possible to mildly carry out ring-opening polymerization of 1,3-dioxolane under conditions of bulk or high concentration—such a polymerization was difficult so far—and to continuously obtain a polydioxolane having a high molecular weight and a high viscosity in high yield.

In addition, the resulting polydioxolane is very useful for films or for moldings, like conventional thermoplastic resins.

We claim:

1. A process for producing a high-molecular-weight polydioxolane, which comprises the steps of:

polymerizing 1,3-dioxolane using a polymerization catalyst comprising an effective amount of a heteropolyacid and a ketone at a sufficient temperature to polymerize said 1,3-dioxolane, wherein said catalyst comprises said ketone compound in the amount of about 10 to 50,000 parts by weight to about 100 parts by weight of said heteropolyacid; and neutralizing the resulting polymerization reaction product using an organic amine and/or ammonia to produce a polymer having a number average molecular weight of about 50,000 to about 300,000.

2. A process as in claim 1, wherein the carbonyl compound has a boiling point lower than 150° C.

3. A process as in claim 1, wherein the heteropolyacid has a water of hydration content of 1 to 15% by weight.

4. A process as in claim 3, wherein the heteropolyacid has a water of hydration content of 3 to 8% by weight.

5. A process as in claim 1, wherein the heteropolyacid is used in a ratio of 0.001 to 2 parts by weight per 100 parts by weight of 1,3-dioxolane.

6. A process as in claim 5, wherein the heteropolyacid is used in a ratio of 0.01 to 0.2 parts by weight per 100 parts by weight of 1,3-dioxolane.

7. A process for producing a hydrophilic thermoplastic resin, which comprises the steps of:

supplying a monomer including 60% by weight or more of a compound having a 1,3-dioxolane ring in its molecule into a kneader;

intermittently adding an effective amount of a polymerization catalyst into a kneader at a sufficient temperature to polymerize said 1,3-dioxolane in order to locally initiate polymerization of the monomer, said polymerization catalyst comprising an effective amount of a heteropolyacid which is combined with a ketone, and wherein the amount of the said ketone is about 10 to 50,000 parts by weight to about 100 parts weight of said heteropolyacid; and adding a neutralizer into the kneader in order to deactivate the polymerization catalyst which is contained in a polymerized product formed in the kneader;

wherein the kneader includes:

a first rotary shaft; and at least one kind of first paddle selected from the group including: a spiral paddle which is installed on a periphery of the first rotary shaft; and numbers of paddles which are arranged at intervals in a direction of a rotational axis.

8. A process as in claim 7, wherein the kneader further includes:

a second rotary shaft which is arranged adjacent and parallel to the first rotary shaft; and at least one kind of second paddle selected from the group including: a spiral paddle which is installed on a periphery of the second rotary shaft; and numbers of paddles which are arranged at intervals in a direction of a rotational axis; the second paddle being arranged at a slight distance from the first paddle.

9. A process as in claim 7, wherein the polymerization catalyst-adding step is carried out in a reaction temperature range of 0° to 70° C.

10. A process as in claim 7, wherein the neutralizer-adding step is carried out within 1 hour after initiation of the polymerization catalyst-adding step.

11. The process of claim 1, wherein said heteropolyacid includes a heteroatom selected from the group consisting of silicon, phosphorous, germanium, titanium, zirconium, boron, arsenic and cobalt.

12. The process of claim 1, wherein said heteropolyacid is selected from the group consisting of phosphotungstic acid, silicotungstic acid, phosphomolybdic acid, silicomolybdic acid, borotungstic acid, boromolybdic acid, cobaltomolybdic acid, cobaltotungstic acid, arsenotungstic acid, germanotungstic acid, phosphomolybdotungstic acid, and boromolybdotungstic acid.

13. The process of claim 1, wherein said heteropolyacid is combined with said 1,3-dioxolane in the range of about 0.0001 to about 0.1 mmol per 1 mole of monomer.

14. The process of claim 1, wherein said carbonyl compound is selected from the group consisting of acetone, methylethyl ketone, methylisobutyl ketone, diacetone alcohol, acetyl acetone, and cyclohexanone.

15. The process of claim 1, comprising polymerizing said 1,3-dioxolane at a temperature of about −10° to 100° C.

16. The process of claim 1, comprising adding said polymerization catalyst intermittently to said 1,3-dioxolane.

17. The process of claim 1, wherein said catalyst is in a solution containing about 0.1 wt % to about 30 wt % of said catalyst in a solvent which does not deactivate said catalyst.

18. The process of claim 1, wherein said polymerizing step is carried out for about 2 to 300 minutes.

19. The process of claim 7, wherein said kneader has a receiving end and a discharge end, said process comprising feeding said monomer and catalyst to said receiving end, and adding said neutralizer into said kneader at said discharge end.

20. The process of claim 7, wherein said catalyst is a heteropolyacid.

21. The process of claim 7, wherein said polymerization catalyst is a heteropolyacid having a water of hydration content of about 1 to 15 wt %.

22. A process for producing a hydrophilic thermoplastic resin, which comprises the steps of:

supplying a monomer including 60% by weight or more of a compound having a 1,3-dioxolane ring in its molecule into a kneader;

intermittently adding an effective amount of a polymerization catalyst into the kneader in order to locally initiate polymerization of the monomer at a reaction temperature of 0° to 70° C., wherein said catalyst comprises a heteropolyacid and a ketone, wherein said ketone is in the amount of about 10 to 50,000 parts by weight to about 100 parts by weight of said heteropolyacid; and adding a neutralizer into the kneader within 1-hour after initiation of the polymerization catalyst—adding step in order to deactivate the polymerization combined catalyst which is contained in a polymerized product formed in the kneader;

wherein the kneader includes:

a first rotary shaft;

at least one kind of first paddle selected from the group including: a spiral paddle which is installed on a periphery of the first rotary shaft; and numbers of paddles which are arranged at intervals in a direction of a rotational axis;

a second rotary shaft which is arranged adjacent and parallel to the first rotary shaft; and at least one kind of second paddle selected from the group including: a spiral paddle which is installed on a periphery of the second rotary shaft; and numbers of paddles which are arranged at intervals in a direction of a rotational axis; the second paddle being arranged at a slight distance from the first paddle.

23. The process of claim 1, wherein said polymerizing step is carried out at a temperature less than 100° C.

24. The process of claim 1, wherein said polymerizing step comprises initiating said polymerization at a temperature of about 0° to 70° C.

25. The process of claim 24, wherein said polymerizing step comprises adjusting the highest polymerization temperature to about 30° to 80° C.

26. The process of claim 1, wherein said polymerization is at a temperature of about −10° C. to 100° C.

27. The process of claim 7, further comprising initiating said polymerization at a temperature of about 0° to 70° C.

28. The process of claim 27, further comprising adjusting the highest polymerization temperature to about 300° to 80° C.

29. The process of claim 7, wherein said polymerization is at a temperature of about −10° C. to 100° C.

30. The process of claim 1, wherein said polymerization step comprises initiating the polymerization at a temperature of about 0° to 40° C.

31. The process of claim 7, further comprising initiating the polymerization at a temperature of about 0° to 40° C.

* * * * *